United States Patent
Rokkan et al.

(10) Patent No.: US 9,873,496 B2
(45) Date of Patent: Jan. 23, 2018

(54) DEPLOYMENT AND RETRIEVAL OF SEISMIC AUTONOMOUS UNDERWATER VEHICLES

(71) Applicant: Seabed Geosolutions B.V., Leidschendam (NL)

(72) Inventors: Arne Henning Rokkan, Olsvik (NO); Geir Valsvik, Laksevag (NO); Bjarne Isfeldt, Mathopen (NO); Jean-Baptiste Danre, Bergen (NO)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 83 days.

(21) Appl. No.: 14/924,555

(22) Filed: Oct. 27, 2015

(65) Prior Publication Data

US 2016/0121983 A1    May 5, 2016

Related U.S. Application Data

(60) Provisional application No. 62/072,263, filed on Oct. 29, 2014.

(51) Int. Cl.
| | |
|---|---|
| G01V 1/38 | (2006.01) |
| B63G 8/00 | (2006.01) |
| B63B 27/16 | (2006.01) |

(52) U.S. Cl.
CPC ............ B63G 8/001 (2013.01); B63B 27/16 (2013.01); G01V 1/3852 (2013.01); *B63B 2027/165* (2013.01); *B63G 2008/007* (2013.01)

(58) Field of Classification Search
CPC ... B63B 27/16; B63B 2027/165; B63G 8/001; B63G 2008/007; G01V 1/3852
(Continued)

(56) References Cited

U.S. PATENT DOCUMENTS

| 5,894,450 A | 4/1999 | Schmidt |
|---|---|---|
| 6,024,344 A | 2/2000 | Buckley |

(Continued)

FOREIGN PATENT DOCUMENTS

| WO | 2014/076075 | 5/2014 |
|---|---|---|
| WO | 2014/090811 | 6/2014 |
| WO | 2014/147165 | 9/2014 |

OTHER PUBLICATIONS

Anderson, Brian and Todd, Chiristi, Ocean Bottom Nodes in Operation, ENGINEERLIVE, Feb. 5, 2013. Downloaded Jun. 16, 2014 from: http://www.engineerlive.com/content/23251.
(Continued)

*Primary Examiner* — Daniel L Murphy
(74) *Attorney, Agent, or Firm* — Park, Vaughan, Fleming & Dowler LLP; Shane Nelson

(57) ABSTRACT

Apparatuses, systems, and methods for the deployment of a plurality of autonomous underwater seismic vehicles (AUVs) on or near the seabed based on acoustic communications with an underwater vehicle, such as a remotely operated vehicle. In an embodiment, the underwater vehicle is lowered from a surface vessel along with a subsea station with a plurality of AUVs. The AUVs are configured to acoustically communicate with the underwater vehicle or a second surface vessel for deployment and retrieval operations. The underwater vehicle and/or second surface vessel is configured to instruct the AUVs to leave the subsea station or underwater vehicle and to travel to their intended seabed destination. The underwater vehicle and/or second surface vessel is also configured to selectively instruct the AUVs to leave the seabed and return to a seabed location and/or a subsea station for retrieval.

30 Claims, 13 Drawing Sheets

(58) Field of Classification Search
USPC .................................. 114/313, 337; 367/15
See application file for complete search history.

(56) References Cited

U.S. PATENT DOCUMENTS

| | | | |
|---|---|---|---|
| 6,474,254 B1 | 11/2002 | Ambs | |
| 6,951,138 B1 | 10/2005 | Jones | |
| 7,310,287 B2 | 12/2007 | Ray | |
| 7,646,670 B2 | 1/2010 | Maxwell | |
| 7,675,821 B2 | 3/2010 | Berg | |
| 7,883,292 B2 | 2/2011 | Thompson | |
| 8,075,226 B2 | 12/2011 | Thompson | |
| 8,427,900 B2 | 4/2013 | Fleure | |
| 8,675,446 B2 | 3/2014 | Gateman | |
| 8,717,844 B2 | 5/2014 | Welker | |
| 9,090,319 B2 | 7/2015 | Brizard | |
| 9,151,857 B2 | 10/2015 | Manin | |
| 2005/0099891 A1* | 5/2005 | Protoolis | G01S 5/18 367/118 |
| 2006/0054074 A1 | 3/2006 | Wingett | |
| 2006/0159524 A1 | 7/2006 | Thompson | |
| 2008/0041296 A1* | 2/2008 | Thompson | B63B 25/28 114/364 |
| 2009/0095209 A1 | 4/2009 | Jamieson | |
| 2011/0266086 A1 | 11/2011 | Welker | |
| 2014/0204708 A1 | 7/2014 | Muijzert | |
| 2014/0301161 A1 | 10/2014 | Brizard | |
| 2015/0316675 A1 | 11/2015 | Brizard | |

OTHER PUBLICATIONS

Krogh, BO, How to Save Time in Offshore Survey Operations, Hydro International, Jul. 2008, vol. 12, No. 6, GIM International. Downloaded Oct. 22, 2014 from: http://www.hydro-international.com/issues/articles/id943-How_to_Save_Time_in_Offshore_Survey_Operations.html?printversie=1.

* cited by examiner

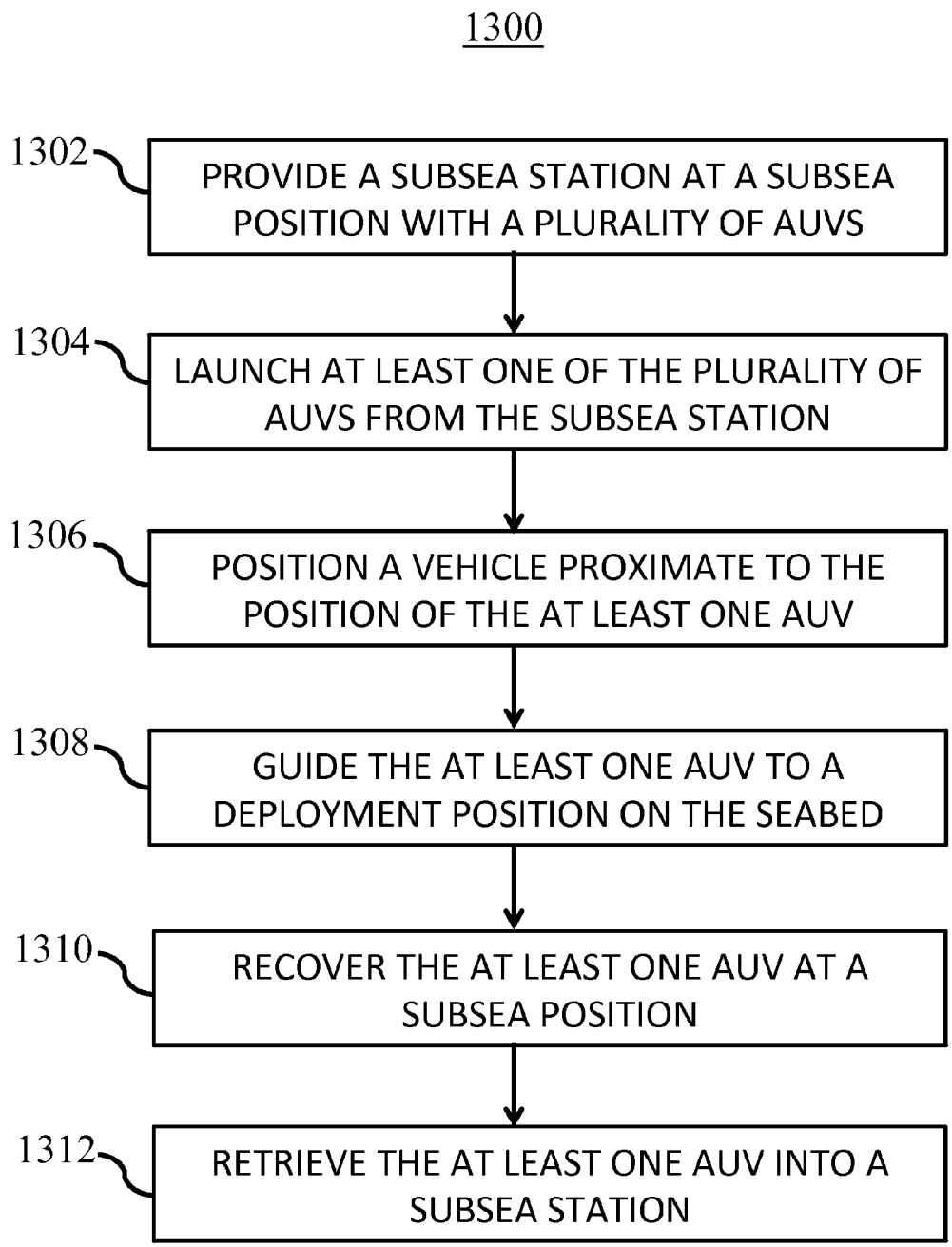

DEPLOYMENT AND RETRIEVAL OF SEISMIC AUTONOMOUS UNDERWATER VEHICLES

PRIORITY

This application claims priority to U.S. provisional patent application No. 62/072,263, filed on Oct. 29, 2014, the entire content of which is incorporated herein by reference.

BACKGROUND OF THE INVENTION

Field of the Invention

This invention relates to seismology and more particularly relates to the deployment and retrieval of seismic autonomous underwater vehicles by an underwater vehicle or surface vehicle.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446.

Emerging technologies in marine seismic surveys need a fast and cost effective system for deploying and recovering seismic receivers that are configured to operate underwater. Newer technologies use AUVs that have a propulsion system and are programmed to move to desired positions and record seismic data. After recording the seismic data, the AUVs are instructed to return to a vessel or underwater base, such as shown in U.S. Publication No. 2014/0301161 and Publication No. WO2014/147165, incorporated herein by reference. Various systems and methods have been proposed for deploying, guiding, and collecting the AUVs. However, none of the existing methods fully address the needs of a seismic survey that uses deployable ocean bottom AUVs to collect the seismic data. For example, if AUVs are to be directly deployed and recovered from a surface vessel (besides having sophisticated equipment to allow such deployment and recovery), the AUV must have enough power to travel to the bottom of the seabed and after seismic data collection, resurface back to the vessel. This is very challenging, particularly in deep-water situations. Communications between each AUV and the surface vessel likewise encounter numerous difficulties.

A need exists for an improved method and system for deploying and retrieving AUVs on the ocean bottom, and in particular one that eliminates the requirement for each AUV to directly communicate with a surface vessel and also allows for faster deployment and recovery of the AUVs from a location other than a surface vessel.

SUMMARY OF THE INVENTION

Apparatuses, systems, and methods for the deployment of a plurality of autonomous underwater seismic vehicles (AUVs) on or near the seabed by using a remotely operated vehicle (ROV) or other underwater vehicle. Each AUV may comprise one or more seismic sensors, a propulsion system, and a guidance system, and the underwater vehicle may comprise a propulsion system and a guidance system.

In one embodiment, a system for the deployment of seismic nodes on or near the seabed comprises a plurality of AUVs, a ROV (or underwater vehicle), and one or more surface vessels configured to communicate with the ROV and/or AUVs. The ROV may be coupled to AUVs that are lowered with it from a surface vessel. The system may include a subsea station (such as a cage or basket) that is lowered from a surface vessel to carry additional AUVs to or near the seabed, or in some embodiments the subsea station is merely lowered a short distance from the water surface and AUVs are deployed from that subsea location. The AUVs are configured to communicate with and be guided by the ROV instead of and/or in addition to the surface vessel. The ROV is configured to instruct the AUVs to leave the ROV and/or subsea station and travel to their intended seabed destination. The ROV is also configured to selectively instruct the AUVs to leave the seabed and return to the ROV and/or subsea station for retrieval. In some embodiments, a second surface vessel is used to launch the AUVs from the subsea station and/or to guide the AUVs from a position proximate to the subsea station and to the seabed.

In one embodiment, a method for the deployment of a plurality of seismic nodes on or near the seabed comprises positioning a first plurality of AUVs near the seabed and deploying the first plurality of AUVs at predetermined positions on the seabed based on communications with an ROV or underwater vehicle. A second plurality of AUVs may also be deployed with the underwater vehicle, whether from a subsea station (such as a cage or basket) or the vehicle itself. The method may also include recovering the deployed AUVs after a seismic survey has been completed. For retrieval, the AUVs may be physically positioned into a ROV skid or subsea station by a robotic arm on the ROV, or the AUVs may travel to another seabed location, the ROV itself, or one or more cages or subsea stations based on communications provided by the ROV or a separate surface vessel.

In one embodiment, an apparatus for the deployment of seismic nodes on or near the seabed comprises a ROV and a skid coupled to the ROV, wherein the skid is configured to carry a plurality of AUVs, and wherein the ROV comprises a guidance system configured to communicate with each of the plurality of AUVs, wherein the guidance system comprises an acoustic system with one or more transmitters. The ROV may be configured to deploy the AUVs individually or simultaneously.

In one embodiment, the disclosed deployment system comprises a plurality of AUVs, a subsea station coupled to a first surface vessel, and a second surface vessel configured to communicate with each of the plurality of AUVs. The subsea station is configured to be lowered and raised by a surface vessel while carrying a plurality of AUVs. The system may include an underwater vehicle, such as an ROV. The subsea station and underwater vehicle may include an acoustics system and a propulsion system. Each of the subsea station, underwater vehicle, and/or surface vessels may be configured to communicate with each of the AUVs to launch them from the subsea station and to guide them to a subsea position, such as a predetermined location on the seabed. In one embodiment, a first communications system may launch the AUVs from the subsea station and a second communications system may guide the AUVs from a position near the subsea station to the seabed. The system is configured to deploy the AUVs from a surface vessel to a seabed location and to recover the AUVs from the seabed location to a surface vessel.

In one embodiment, the disclosed deployment method comprises positioning a first plurality of AUVs in a subsea station on a first surface vessel, lowering the subsea station from the first surface vessel to a first subsea location, launching the first plurality of AUVs from the subsea station, and deploying each of the first plurality of AUVs at a predetermined position on the seabed. The method may include using an underwater vehicle or a second surface vessel for communications to each of the plurality of AUVs, such as launching them from the subsea station and/or guiding them to the seabed. The method may include launching additional pluralities of AUVs from the surface vessel in one or more subsea station. The method may further include recovering such AUVs from the seabed by communications with an underwater vehicle or a surface vessel into a subsea recovery station, which may or may not be the same subsea station used to deploy the AUVs.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 13 illustrates one embodiment of a method to deploy and recover AUVs using a subsea station.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Autonomous Underwater Vehicles

In one or more embodiments, an autonomous underwater vehicle (AUV) is used to record seismic signals on or near the seabed. An AUV in the following description is considered to encompass an autonomous self-propelled underwater seismic node that has one or more sensors capable of detecting seismic waves in a marine environment. The following embodiments are discussed, for simplicity, with regard to the terminology and structure of an AUV with seismic sensors for recording seismic waves. In general, the structure and operation of a seismic AUV is well known to those of ordinary skill For example, Applicant's U.S. Pat. No. 9,090,319, incorporated herein by reference, discloses one type of autonomous underwater vehicle for marine seismic surveys.

Figure 1:
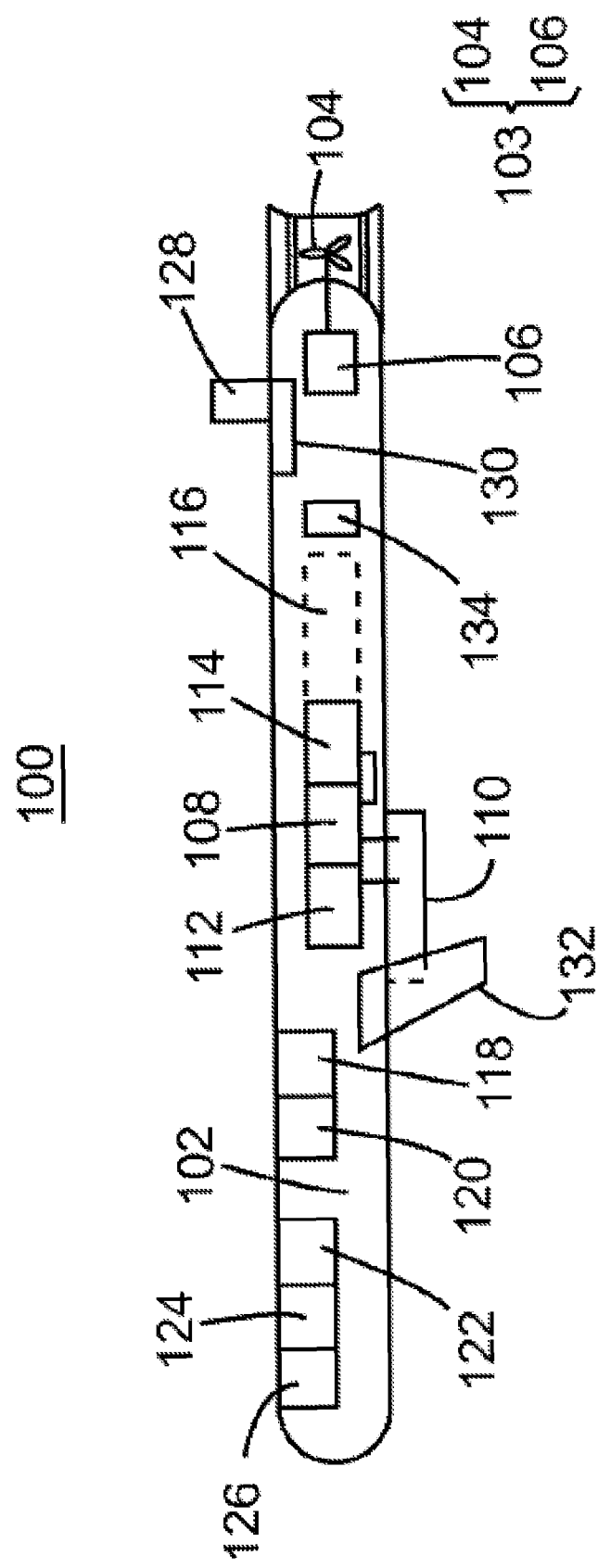
FIG. 1 illustrates one embodiment of a schematic diagram of an AUV.

FIG. 1 illustrates one embodiment of AUV 100 having a body 102 in which propulsion system 103 may be located. Propulsion system 103 may include one or more propellers 104 and motor 106 for activating propeller 104. Other propulsion systems may be used, such as jets, thrusters, pumps, etc. Alternatively, the propulsion system may include adjustable wings for controlling a trajectory of the AUV. Motor 106 may be controlled by a processor/controller 108. Processor 108 may also be connected to seismic sensor 110. Seismic sensor 110 may have a shape such that when the AUV lands on the seabed, the seismic sensor achieves a good coupling with the seabed sediment. The seismic sensor may include one or more of a hydrophone, geophone, accelerometer, etc. For example, if a 4C (four component) survey is desired, seismic sensor 110 may include three accelerometers and a hydrophone, i.e., a total of four sensors. Alternatively, the seismic sensor may include three geophones and a hydrophone. Of course, other sensor combinations are possible, and may include one or more of a hydrophone, geophone, accelerometer, electromagnetic sensor, depth sensor, MEMs, or a combination thereof. Seismic sensor 110 may be located completely or partially inside body 102. Memory unit 112 may be connected to processor 108 and/or seismic sensor 110 for storing seismic data recorded by seismic sensor 110. Battery 114 may be used to power all these components. Battery 114 may be allowed to shift its position along a track 116 to change the AUV's center of gravity. This shift may be controlled by processor 108.

The AUV may also include an inertial navigation system (INS) 118 configured to guide the AUV to a desired location. An inertial navigation system may include a module containing accelerometers, gyroscopes, magnetometers, or other motion-sensing devices. The INS may initially be provided with the current position and velocity of the AUV from another source, for example, a human operator, a GPS satellite receiver, a deployed ROV, another INS from the vessel, etc., and thereafter, the INS computes its own updated position and velocity by integrating (and optionally filtrating) information received from its motion sensors. One advantage of an INS is that it requires no external references in order to determine its position, orientation or velocity once it has been initialized. As noted above, alternative systems may be used, as, for example, acoustic positioning. An optional acoustic Doppler velocity log (DVL) (not shown) can also be employed as part of the AUV, which provides bottom-tracking capabilities for the AUV. Sound waves bouncing off the seabed can be used to determine the velocity vector of the AUV, and combined with a position fix, compass heading, and data from various sensors on the AUV, the position of the AUV can be determined. This assists in the navigation of the AUV and provides confirmation of its position relative to the seabed.

Besides or instead of INS 118, the AUV may include compass 120 and other sensors 122 as, for example, an altimeter for measuring its altitude, a pressure gauge, an interrogator module, etc. The AUV 100 may optionally include an obstacle avoidance system 124 and a communication device 126 (e.g., Wi-Fi or other wireless interface, such as a device that uses an acoustic link) or other data transfer device capable of wirelessly transferring seismic data and/or control status data. One or more of these elements may be linked to processor 108. The AUV further includes antenna 128 (which may be flush with or protrude from the AUV's body) and corresponding acoustic system 130 for subsea communications, such as communicating with a deployed ROV (or other underwater station), another AUV, or a surface vessel or station. For surface communications (e.g., while the AUV is on a ship), one or more of antenna 128 and communication device 126 may be used to transfer data to and from the AUV. Stabilizing fins and/or wings 132 for guiding the AUV to the desired position may be used with propulsion system 103 for steering the AUV. However, in one embodiment, the AUV has no fins or wings. The AUV may include buoyancy system 134 for controlling the AUV's depth and keeping the AUV steady after landing.

Acoustic system 130 may be an Ultra-Short Baseline (USBL) system, also sometimes known as Super Short Base Line (SSBL). This system uses a method of underwater acoustic positioning. A complete USBL system includes a transceiver or acoustic positioning system mounted on a pole under a vessel or ROV (such as Hi-PAP, commercially available by Kongsberg) and a transponder on the AUV. In general, a hydro-acoustic positioning system consists of both a transmitter (transducer) and a receiver (transponder). An acoustic positioning system uses any combination of communications principles for measurements and calculations, such as SSBL. In one embodiment, the acoustic positioning system transceiver comprises a spherical transducer with hundreds of individual transducer elements. A signal (pulse) is sent from the transducer, and is aimed towards the seabed transponder. This pulse activates the transponder, which responds to the vessel transducer. The transducer detects this return pulse and, with corresponding electronics, calculates an accurate position of the transponder relative to the vessel based on the ranges and bearing measured by the transceiver. In one embodiment, to calculate a subsea position, the USBL system measures the horizontal and vertical angles together with the range to the transponder (located in the AUV) to calculate a 3D position projection of the AUV relative to the ROV or the vessel. An error in the angle measurement causes the position error to be a function of the range to the transponder, so an USBL system has an accuracy error increasing with the range. Alternatively, a Short Base Line (SBL) system, an inverted short baseline (iSBL) system, or an inverted USBL (iUSBL) system may be used, the technology of which is known in the art. For example, in an iUSBL system, the transceiver is mounted on or inside the AUV while the transponder/responder is mounted on the surface vessel or the ROV and the AUV has knowledge of its individual position rather than relying on such position from a surface vessel (as is the case in a typical USBL system). In another embodiment, a long baseline (LBL) acoustic positioning system may be used. In a LBL system, reference beacons or transponders are mounted on the seabed around a perimeter of a work site as reference points for navigation. The LBL system may use an USBL system to obtain precise locations of these seabed reference points. Thus, in one embodiment, the reference beacon may comprise both an USBL transponder and a LBL transceiver. The LBL system results in very high positioning accuracy and position stability that is independent of water depth, and each AUV can have its position further determined by the LBL system. The acoustic positioning system may also use an acoustic protocol that utilizes wideband Direct Sequence Spread Spectrum (DSSS) signals, which provides for a greater communications range in the water.

Figure 2:
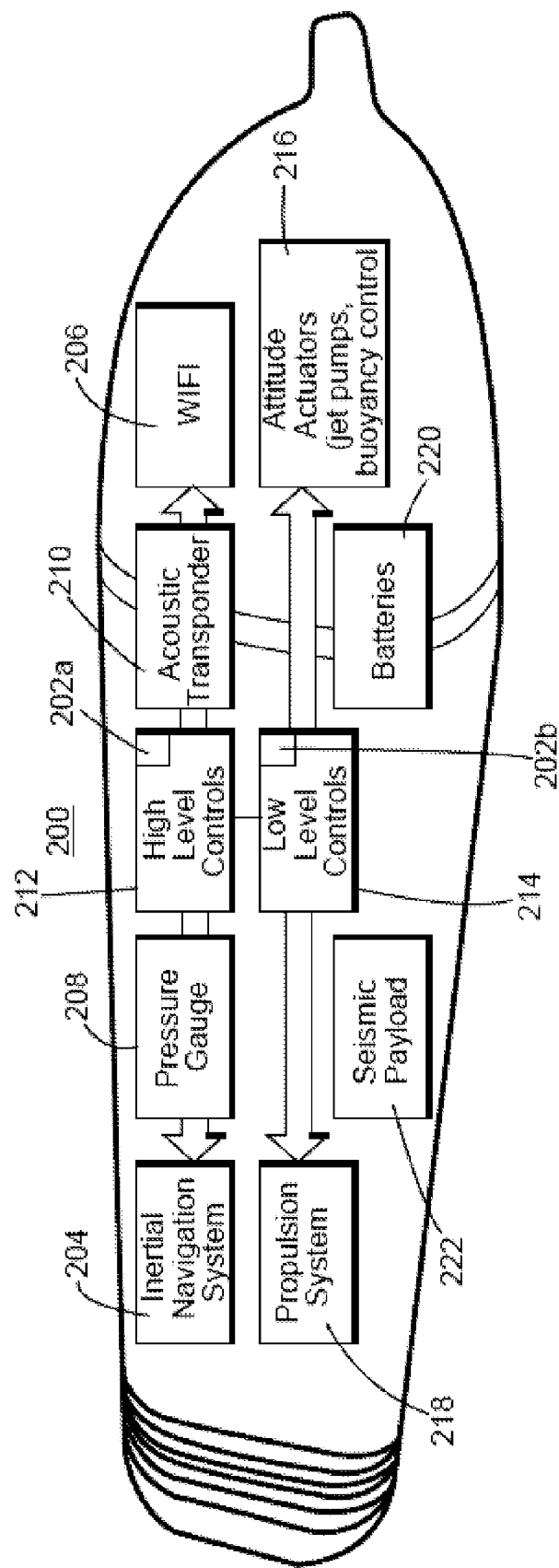
FIG. 2 illustrates another embodiment of a schematic diagram of an AUV.

With regard to the AUV's internal configuration, FIG. 2 schematically shows a possible arrangement for the internal components of an AUV 200. While FIG. 2 illustrates an AUV with a submarine-like shape, other AUV body shapes are possible and include many cross-sectional variations, including low profile, rectangular, triangular, square, circular, flat-bottomed, etc. In one embodiment, AUV 200 includes CPU 202a that is connected to internal navigation system (INS) 204 (or compass or altitude sensor and acoustic transmitter for receiving acoustic guidance from the mother vessel), wireless interface 206, pressure gauge 208, and acoustic transponder 210. CPU 202a may be located in high-level control block 212. The INS is advantageous when the AUV's trajectory has been changed, for example, because of an encounter with an unexpected object (e.g., fish, debris, etc.), because the INS is capable of taking the AUV to the desired final position as it encounters currents, wave motion, etc. Also, the INS may have high precision. For example, an INS may be accurate up to 0.1% of the travelled distance, and a USBL system may be accurate up to 0.06% of the slant range. Thus, it is expected that for a target having a depth of 1000 m, the INS and/or the acoustic guidance is capable of steering the AUV within +/−1 m of the desired target location. The INS may be also configured to receive data from a surface vessel and/or a deployed ROV to increase its accuracy. An optional CPU 202b, in addition to the CPU 202a, is part of low-level control module 214 configured to control attitude actuators 216 and propulsion system 218. High-level control block 212 may communicate via a link with low-level control module 214. One or more batteries 220 may be located in AUV 200. A seismic payload 222 is located inside the AUV for recording the seismic signals. As another embodiment, an obstacle avoidance system may be included in the AUV, which is generally configured to detect an object in the path of the AUV and divert the AUV from its original route to avoid contact with the object. In one example, the obstacle avoidance system includes a forward-looking sonar. CPU 202a and 202b may be coupled with one or more internal components to the AUV and provide any necessary control circuitry and software for associated components. Those skilled in the art would appreciate that more or less modules may be added to or removed from the AUV. For example, if a seismic sensor is outside the AUV's body, a skirt may be provided around or next to the sensor. A water pump may pump water from the skirt to create a suction effect, achieving a good coupling between the sensor and the seabed. However, there are embodiments in which no coupling with the seabed is desired. For those embodiments, no skirt is used.

Remotely Operated Vehicle

In general, the structure and operation of marine ROVs are well known to those of ordinary skill For example, Publication No. WO2014/090811, incorporated herein by reference, describes a ROV configured to deploy and retrieve autonomous seismic nodes to the seabed with a separate AUV configured to monitor and exchange data with the seismic nodes. Likewise, U.S. Pat. No. 8,075,226, incorporated herein by reference, describes a ROV configured to physically deploy autonomous seismic nodes from a carrier located on the ROV as well as a basket lowered by a surface vessel and to mechanically connect the ROV to the lowered basket to transfer nodes from the basket to the ROV carrier. What is lacking in the prior art, however, is a ROV or other underwater vehicle that is configured to deploy seismic AUVs—which have the ability to travel subsea on their own—based on communications with the underwater vehicle rather than reliance only on a surface vessel communication. Similarly lacking in the prior art is a comprehensive communications system that is configured to deploy and recover seismic AUVs based on communications from a plurality of locations, including a second surface vessel (separate from the deployment vessel) and one or more of the cage or ROV.

Figure 3:
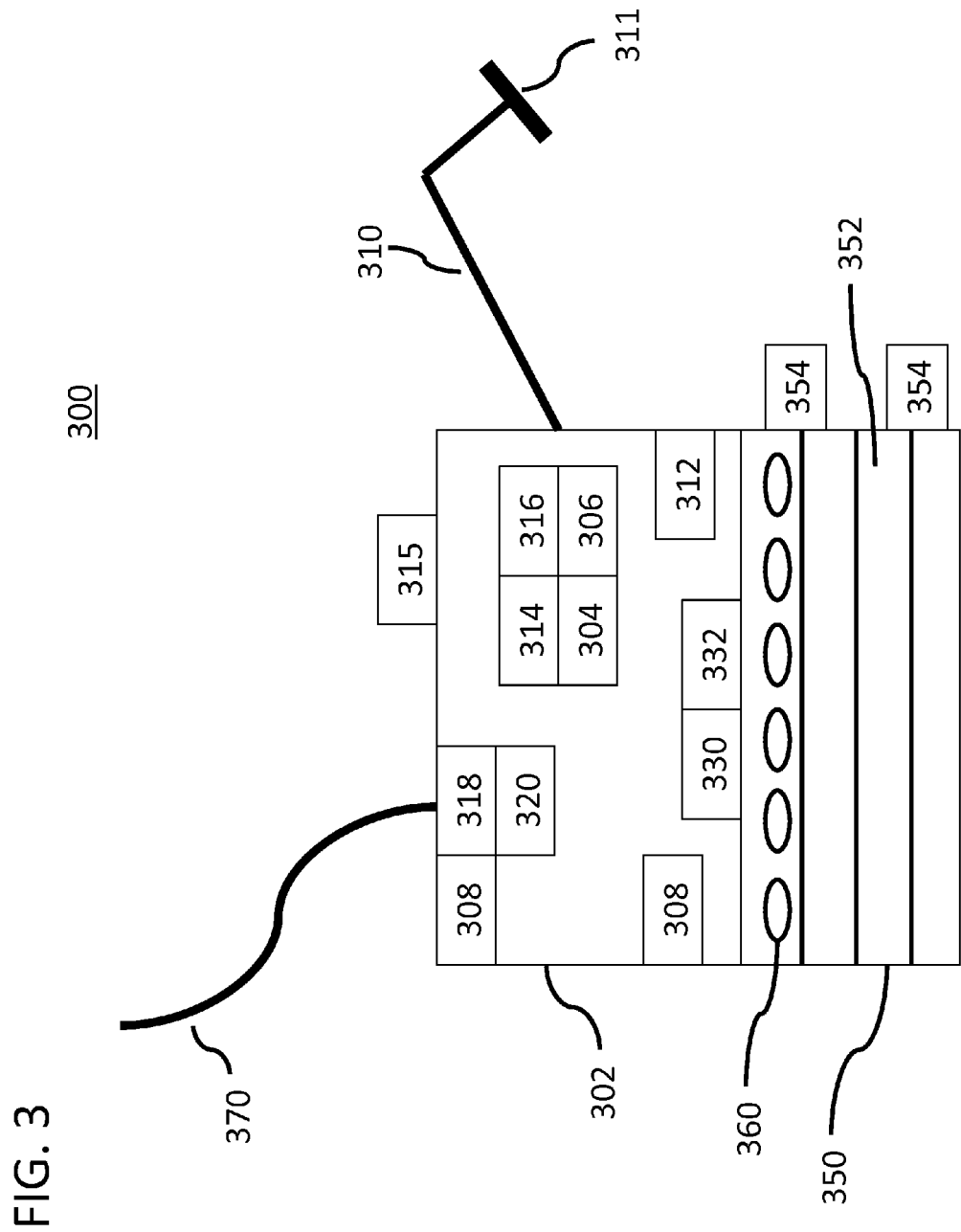
FIG. 3 illustrates one embodiment of a schematic diagram of a ROV.

FIG. 3 illustrates one embodiment of an underwater vehicle structure 300, which may be an ROV in one embodiment. ROV 300 may have frame 302 to which processor 304 and memory storage device 306 are attached. Plural actuators (e.g., propellers) 308 are coordinated by processor 304 for guiding the ROV underwater, and may be placed at various positions on frame 302 as is known in the art. ROV 300 may include robotic arm 310 for general mechanical operations underwater, including the physical movement of the AUVs during deployment and retrieval operations by handle 311. One or more cameras 312 may be attached to frame 302 for monitoring the positions of the ROV and its robotic arm while subsea. An operator may use cameras 312 for driving the ROV, monitoring the deployment of nodes, and for maneuvering nodes and other equipment. The ROV may include one or more power interfaces 330 configured to transfer power from the ROV to another device, such as AUVs 360. A data and control interface 332 may be used for transferring seismic data from AUV 360 to storage device 306, or for transferring operational instructions to the AUV. In one embodiment, telemetry system 318 is configured to transfer data between ROV 300 and a surface vessel through tether system 370. The ROV may be controlled by an operator from the surface through tether 370. Other electronic components 320 can be provided on the ROV for particular tasks and/or operations.

In one embodiment, the ROV may be coupled with skid or storage chamber 350. In some embodiments, skid 350 may be integrally connected to frame 302. Skid 350 is used and configured to store and/or transfer a plurality of AUVs 360 to and from the ROV. Skid 350 may comprise a plurality of baskets that store the nodes. In one embodiment, skid 350 comprises a plurality of levels with slots, trays, or conveyors 352 on which a plurality of nodes can be stored and/or moved. The trays or conveyors may extend partially out from the skid and/or ROV while the AUVs are being deployed or retrieved from the ROV. In other embodiments, AUVs may move longitudinally along a path in the skid without a tray extending outside of the ROV. In one embodiment, skid 350 may have dimensions of meters, e.g., 3×3×5 meters, and is configured to be flooded with water. Nodes can be loaded onto skid 350 while the ROV is on the marine vessel and prior to the deployment of ROV, and may include a locking mechanism to secure AUVs while the ROV is being lowered from the vessel. In other embodiments, AUVs can be transferred to and from the ROV underwater via robotic arm 310, which may be attached to handle 311 for moving the nodes to and from the ROV. In one embodiment, skid 350 may include one or more transfer receptacles 354 to facilitate transfer of AUVs with the ROV with or without the use of robotic arm 310. For example, transfer receptacles 354 may engage and/or couple to a corresponding receptacle on a cage or basket to transfer AUVs between the ROV and cage, and in some embodiments, transfer receptacles 354 also provide power to the cage. Thus, during deployment, trays loaded with AUVs may be transferred to the skid and empty trays from the ROV may be returned to the cage; likewise, during retrieval, trays loaded with AUVs may be transferred from the ROV to the cage. Other AUV conveyance and transfer mechanisms are possible. In some embodiments, AUVs may be configured to launch from the ROV or be recovered to the ROV without use of the robotic arm and while the ROV is in motion and hovering above the seabed.

An accurate position of the underwater vehicle is necessary for accurate positioning of the AUVs. In one embodiment, ROV 300 comprises navigation system 314 and guidance system 316. Navigation system 314 is configured to know the position of the ROV and is capable of guiding the ROV to a desired location. In one embodiment, navigation system 314 may comprise any one or more of the following navigation systems: INS, DVL, USBL, iSBL, iUSBL, LBL, or any combination thereof. In another embodiment, ROV 300 further comprises guidance system 316 for the guiding of and/or communicating to a plurality of AUVs and other subsea devices. One or more acoustic systems 315 may be part of and/or coupled to each of navigation system 314 and/or guidance system 316. In one embodiment, guidance system 316 may comprise any one or more of the following navigation systems: USBL, iSBL, iUSBL, or any combination thereof. With a known position of ROV 300, the ROV is able to provide more accurate positioning coordinates to the AUVs. The ROV is able to provide positioning coordinates in local or absolute grid or navigation orders to the AUVs based on pre-programmed AUV destination coordinates. Alternatively, AUV destination coordinates or guidance can be received from one or more surface vessels to navigation system 314 after the ROV has been deployed and when it is at or near the ocean bottom. Each AUV can then not only be launched from the ROV to move to its intended deployment location, but can also calculate its return path back to the ROV. Each AUV may be guided to a specific position based on a variety of navigation mechanisms and is configured to communicate with the ROV to receive guidance as to its position and/or destination. In one embodiment, the AUV knows its absolute position and can act accordingly based on its own INS and/or navigation system. In other embodiment, the AUV knows its relative position compared to a target or destination position and takes appropriate navigation measures to reduce the distance between its current and destination positions. In still another embodiment, the position of the AUV is known by the ROV and the ROV provides specific guidance to the AUV (such as heading, distance, speed, attitude, position, etc.) for the AUV to reach its intended destination. In one embodiment, the AUV is configured to receive navigation data from the ROV on the ROV's position (such as ROV speed, pitch, roll, heading) and to use such data in connection with its navigation system and to properly position the AUV in reference to the ROV.

Figure 4:
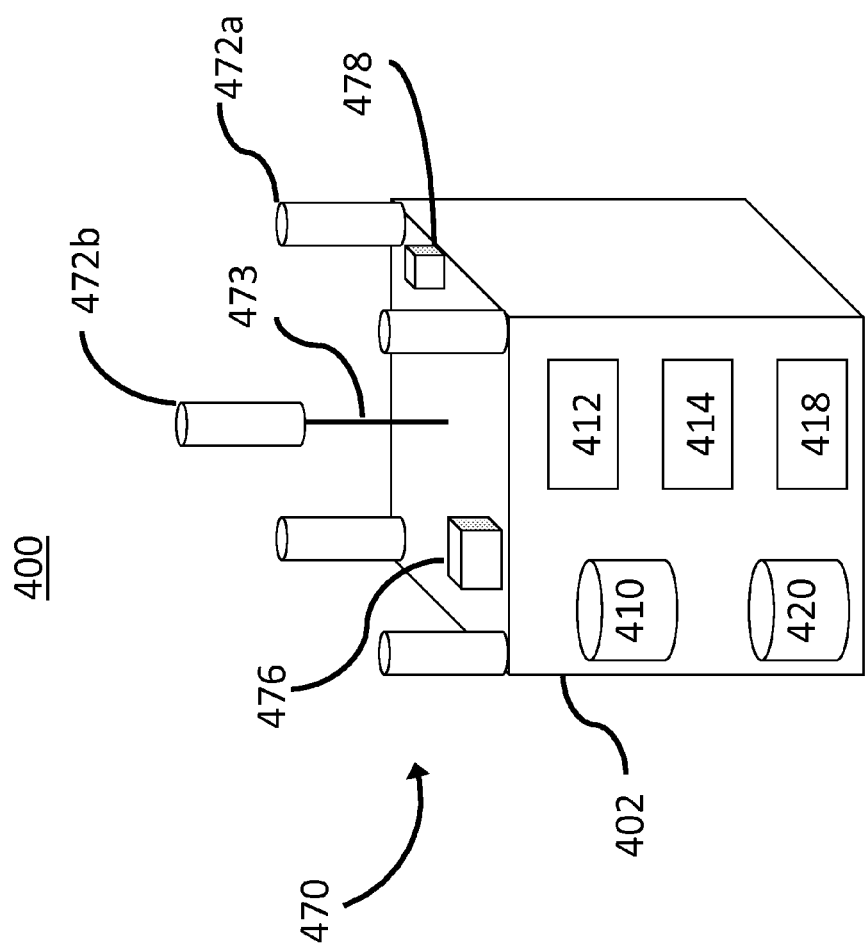
FIG. 4 illustrates one embodiment of a schematic diagram for a ROV guidance system.

FIG. 4 illustrates one embodiment of a schematic illustration of navigation system 400 that may be used by the ROV, which may comprise control system 410 that interfaces with guidance system 420 and acoustic system 470. In some embodiments, some or all of the components shown in FIG. 4 may be used with any underwater vehicle or subsea cage or basket. While not shown, navigation system 400 may be coupled to any number of modules or components on the ROV, such as processor 304. In one embodiment, navigation system 400 comprises clock 412, navigation device 418, and additional electronic components 414. Navigation device 418 may include an inertial navigation system (see, e.g., INS 204), an attitude and heading reference system (AHRS), or another similar device, such as a Doppler Velocity Log (DVL). Navigation device 418 is used for determining an accurate position and orientation of the ROV, including position, true heading, attitude, speed and heave of the ROV. In one embodiment, navigation device 418 is configured to interface with one or more elements of any acoustic positioning equipment on the ROV and/or acoustic system 470. Thus, in one embodiment, navigation system 400 and/or acoustic system 470 may communicate with one or more surface vessels to obtain and/or verify the position of the ROV.

In one embodiment, navigation system 400 includes guidance system 420 for the guiding of and/or communicating to a plurality of AUVs. In other embodiments, guidance system 420 is separate from and operates independently of navigation system 400 and acoustic system 470, but is configured to interface with navigation system 400 and/or acoustic system 470. In one embodiment, guidance system 420 is configured to communicate with a plurality of AUVs and to provide guidance to departing and/or arriving AUVs from the ROV while deployed in the ocean. In one embodiment, acoustic system 470 may be any one or more of USBL, iSBL, iUSBL, or any combination thereof and is used to communicate with and position the ROV from a surface vessel.

In one embodiment, acoustic system 470 may comprise a plurality of acoustic transmitters 472a-b, acoustic transceiver 476, and acoustic modem 478. In some embodiments, clock 412 may be used for transmissions requiring synching, as is known in the art. Acoustic modem 478 is needed if there is an exchange of information or messages in an acoustic signal/message. Transceiver 476 communicates with an acoustic positioning system of a surface vessel and/or other sub-surface vessel or station (such as an AUV). In one embodiment, acoustic system 470 interfaces with guidance system 420 to position the plurality of AUVs. In another embodiment, acoustic system 470 is used to position both the ROV and the plurality of AUVs, and management and guidance of the ROV and AUVs is provided by a surface vessel, such as the deployment vessel or a second surface vessel. In this embodiment, the ROV is configured with one or more transponders, as well as an acoustic modem and a clock. In other embodiments, acoustic system 470 is configured to communicate with one or more surface vessels and/or one or more AUVs.

In one embodiment, acoustic system 470 comprises transmitter 472a at proximately each of the top corners of frame 402 of the ROV and transmitter 472b attached to stand 473 in the top middle portion of the ROV. The stand 473 provides a different height and elevation to at least one of the plurality of transmitters. The transmitters 472 can be located at other positions of the ROV. Having more transmitters is desirable so that during a seismic survey, each AUV has a "direct view" of at least three transmitters for positioning itself. In one application, at least two of the transmitters are positioned within a base of a pyramid, while at least one of the transmitters is positioned at the top of the pyramid. In this arrangement, each AUV has the capability to position itself in a horizontal and vertical plane relative to the ocean bottom. In one application, a distance between two transmitters may be in the order of meters, for example, 2.5 meters, and with such a configuration, it is expected that an AUV could detect its position from 1 km away with good precision (e.g., within 1 m). As the technology improves, it is expected that these numbers will become even better. In one embodiment, each transmitter 472 emits pings and has no capability to receive signals. A transmitter may include a ceramic element that emits the acoustic signal and corresponding electronics unit that interacts with control system 410 and also controls the ceramic element. In one embodiment, the system of transmitters may form a short base line (SBL) system. In another embodiment, the acoustic system may form an inverted short baseline (iSBL) system.

In one embodiment, each AUV deployed in the ocean has a different channel or code based on spread spectrum domain as to which it receives and sends communications. For example, an AUV may be configured to receive low frequencies in the range of 40 kHz, which provides for long distance communications. Thus, control system 410 and/or guidance system 420 is programmed to select appropriate frequency channels for the transmitters, to adjust the channels if necessary, and to synchronize the transmitters. In one embodiment, transmitters 472 are configured to send a plurality of communications over a range of frequencies, each frequency corresponding to a separate AUV, which can be selectively filtered by an AUV during reception of the transmission. Guidance system 420 is configured to send information from the transmitters to the AUVs. In one embodiment, guidance system 420 is configured to interrogate the AUVs about their position and status, selectively instruct one or more of them to return to the ROV, etc. Similar embodiments may be used in connection with deployment from a second surface vessel that is positioned proximate to the AUVs or a subsea cage or basket.

In one embodiment, the configuration of the guidance system and/or acoustic system on the ROV has a corresponding match on each of the AUVs. For example, in one embodiment, the ROV comprises a transceiver and a plurality of transmitters while each AUV comprises at least one transponder. Alternatively, the ROV may comprise a plurality of transponders while each AUV comprises a transceiver. In either embodiment, each of the AUVs and ROV may also comprise a clock (particularly if the acoustic positioning system is synchronous) and an acoustic modem.

System and Operation

Generally, a deployment vessel stores a plurality of AUVs and a separate shooting vessel may be used to generate seismic waves. The shooting vessel may tow one or more seismic source arrays, each one including plural source elements. A source element may be an impulsive element (e.g., a gun) or a vibratory element. In one embodiment, the deployment vessel also tows and shoots source arrays as it deploys the AUVs. When the AUVs are in recording position (on the seabed), seismic waves are generated, which are recorded by the sensors on the AUVs. In one embodiment, the number of AUVs is in the thousands. In one embodiment, the deployment vessel is configured to hold all of the AUVs at the beginning of the seismic survey and then to launch them as the survey advances.

As discussed above, with the use of an ROV or other underwater vehicle with the necessary installed systems, in one embodiment the AUVs need not have to communicate with the deployment vessel; instead, each AUV needs only to communicate with the deployed ROV. This system is much more accurate, fast, and cost effective than current systems to deploy seismic AUVs on the seabed. Further, the use of an ROV assisted guidance system for AUVs solves many problems with the prior art, as described above. In still other embodiments, a second surface vessel may be used that is positioned closer to the deployed AUVs than is possible with the deployment vessel. This second vessel may be used in addition to the ROV or in lieu of the ROV to send communications to the plurality of AUVs and to guide them to and from a seabed location. Still further, the lowered basket or cage itself may include various communication systems that are configured to launch the AUVs from the cage and to deploy them to the seabed (with or without communications from the ROV or second surface vessel). In these embodiments, one or more communications systems are used (separate from the deployment vessel) to facilitate deployment and retrieval of the AUVs.

Figure 5:
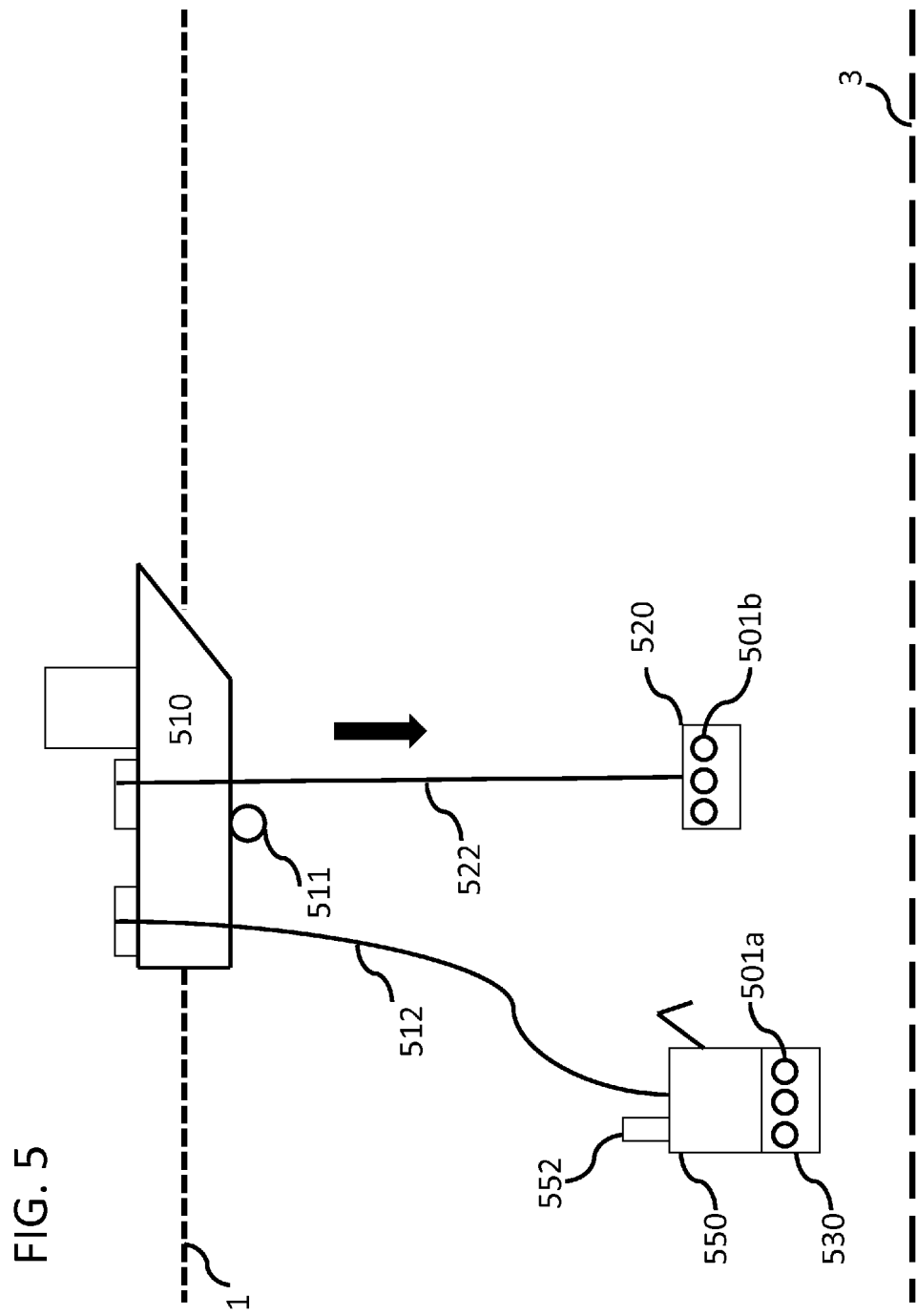
FIG. 5 illustrates one embodiment of a ROV assisted deployment system for AUVs.

FIG. 5 illustrates one system for using an ROV or other underwater vehicle to position a plurality of autonomous seismic nodes on or near seabed 3. In one embodiment, deployment vessel 510 launches ROV 550 into the ocean from surface 1. Deployment vessel 510 also launches cage or basket 520 (which may be any container or structure that is capable of holding a plurality of AUVs suitable for transfer to the seabed, which may or may not include a communications systems and a propulsion system) into the ocean, which may occur before, during, or after the deployment of ROV 550. In one embodiment, cage 520 includes a frame or housing with a base that is configured to land on the seabed. The cage may include a plurality of levels or slots that are configured to each hold a plurality of AUVs, such as on a conveyor, conveyor belt, carousel, or tray. The cage may also include a connecting mechanism for connecting to a hook or other connecting device extending from a support vessel, as well as a coupling mechanism for connecting to an ROV for the transfer of AUVs to and from the ROV. ROV 550 is configured with skid 530 or other similar AUV storage structure (which may be substantially similar to skid 350) that can hold a first plurality of AUVs 501a.

In one embodiment, ROV 550 is lowered into the ocean via umbilical cable 512 and cage 520 (after being loaded with a plurality of AUVs while on board vessel 510) is lowered into the ocean by wire 522. In one embodiment, both the ROV 550 and cage 520 are lowered on or near the seabed with first plurality of AUVs 501a and second plurality of AUVs 501b, respectively. In some embodiments, cage 520 is lowered only a small distance beneath surface 1. In other embodiments, plurality of AUVs 501b are only lowered to the seabed in cage 520 without AUVs 501a being lowered with ROV 550. In one embodiment, ROV 550 knows the approximate initial deployment location for the AUVs and may find its desired position using, for example, an inertial navigation system (INS), which may be part of and/or coupled to guidance system 552 on ROV 550. Guidance system 552 may be substantially similar to acoustic system 315 and/or 470 of ROV (see FIGS. 3 and 4). ROV is configured to know its position based on communications with surface vessel 510 (or other surface vessels). ROV 550 is configured to communicate with surface vessel 510 via umbilical cable 512 and/or acoustic positioning system 511 located on the vessel. In some embodiments, use of a neutrally buoyant tether or tether management system to ROV 550 can also be utilized, which is particularly helpful in deep-water applications. The use of umbilical 512 connected to the ROV provides a much faster data transfer than acoustic communications via acoustic positioning system 511, and may result in an increased update speed of the data with ROV 550.

Once ROV 550 reaches a location proximal to the intended deployment location for AUVs 501a, a signal is sent from guidance system 552 to activate AUVs 501a that are stored in ROV 550. Once activated, one or more of the AUVs 501a travel to their destination (which may be on the seabed or proximal to the seabed) to get positioned for recording seismic waves. In one embodiment, each AUV 501a has its own channel or code based on spread spectrum domain such that ROV 550 can selectively communicate with each AUV. In one embodiment, each AUV 501a may be preprogrammed or partially programmed prior to launch from the ROV to find its destination position using an INS of the AUV and the coordinates of ROV 550 as a reference point. However, in another application, AUV 501*a* finds its desired position using a combination of acoustic guidance, waypoint navigation and information from various navigation sensors such as an inertial measurement unit, echo sounder, pressure gauge, etc., including communications from guidance system 552. Other systems or methods may be used for finding their desired positions. After launch from ROV 550, AUV 501*a* is configured to communicate with guidance system 552 to determine the position of AUV 501*a* and find its destination in route. The final details, positions, and/or coordinates for finding the desired destination position of AUV 501*a* may be received, acoustically, from ROV 550. Once AUV 501*a* lands at its destination on the seabed, the final destination point can be communicated to and/or verified by ROV 550. In one embodiment, the launching of AUVs 501*a* is performed while surface vessel 510 is still moving in the general direction of the intended seismic survey pattern, while in other embodiments surface vessel 510 remains substantially stationary on the surface. In one embodiment, a plurality of AUVs 501*a* can be launched from ROV 550 at a particular time, such that all AUVs leave the ROV at or near the same time. In other embodiments, one or more of the plurality of AUVs 501*a* are launched at a particular time based upon the intended destination location, such that a plurality of AUVs may remain with the ROV as one or more AUVs are deployed. The use of ROV 550 to guide AUVs 501*a* provides a much faster, reliable, and accurate method to position seismic AUVs on the seabed than current techniques.

Once all or substantially all of AUVs 501*a* have been launched from ROV 550, second plurality of AUVs 501*b* that are stored in cage 520 can be deployed in a similar manner. In another embodiment, a second plurality of AUVs 501*b* can be launched from cage 520 at or near the same time that a first plurality of AUVs 501*a* are launched from ROV 550. In one embodiment, AUVs 501*b* are launched directly from cage 520 based on communications with guidance system 552. In another embodiment, ROV 550 moves towards the position of cage 520 and retrieves AUVs 501*b* and stores them in skid 530 of ROV 550 after the first plurality of AUVs 501*a* have been deployed. In one embodiment, transfer receptacles 354 on ROV 550 (see FIG. 3) engage with cage 520 to transfer AUVs 501*b* or trays of AUVs 501*b* to the ROV 550. Robotic arm 310 on ROV 550 may or may not be used to facilitate the transfer of AUVs 501*b* and/or the positioning of AUVs on the seabed. In one embodiment, skid 530 and/or cage 520 may comprise one or more conveyor belts or lateral moving mechanisms that transfer the AUVs from cage 520 to ROV 550.

Figure 6:
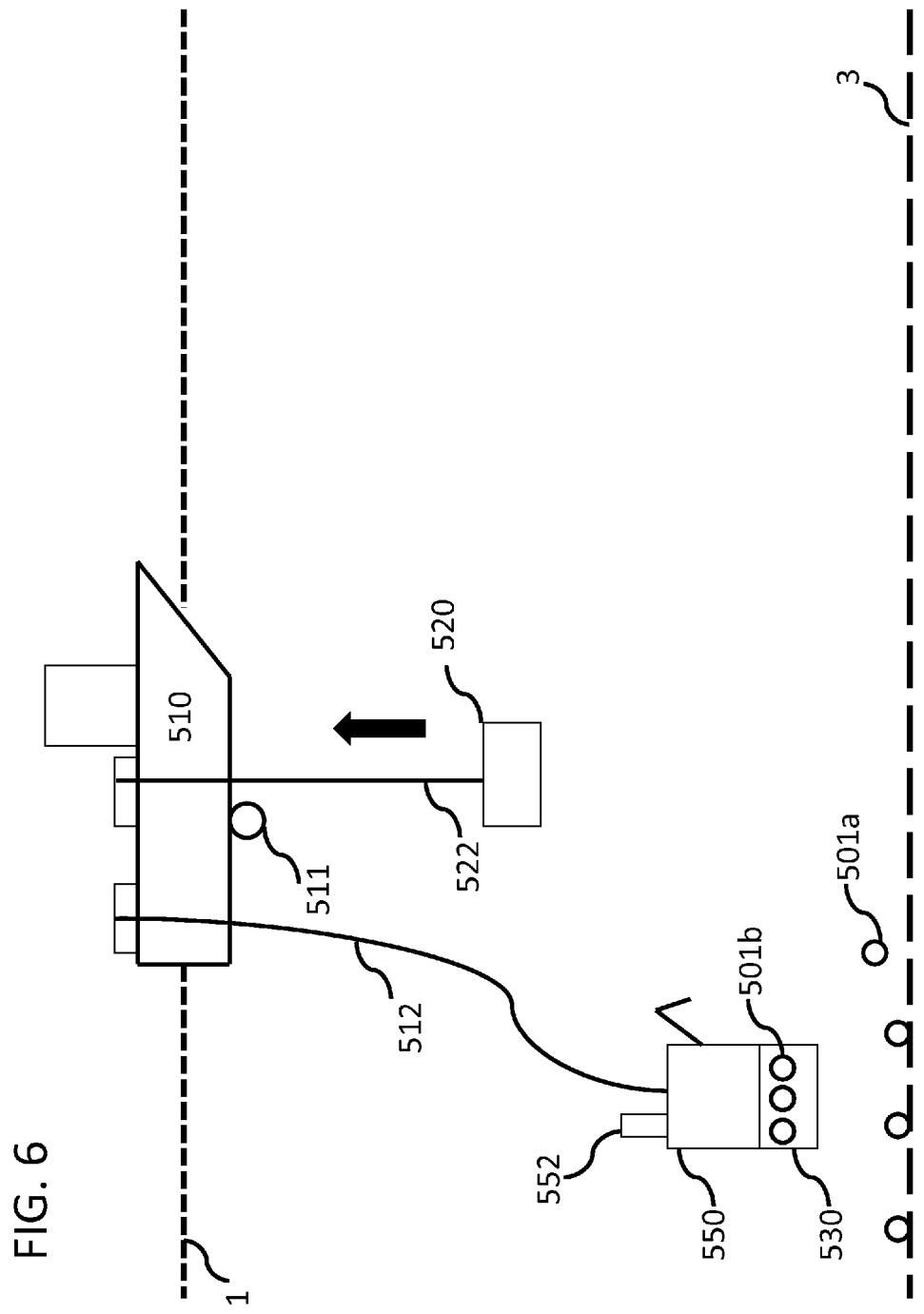
FIG. 6 illustrates one embodiment of a ROV assisted deployment system for AUVs.

As shown in FIG. 6, once all of second plurality of AUVs 501*b* have transferred from cage 520, cage 520 is raised to surface 1 by surface vessel 510 to obtain a new set of AUVs. Meanwhile, first plurality of AUVs 501*a* have been deployed to seabed 3 or are in transit to their destinations, and second plurality of AUVs 501*b* (previously transferred from cage 520) remain stored in ROV 550 while awaiting launch instructions from ROV 550. In one embodiment (not shown), by the time the second plurality of AUVs 501*b* have been deployed from ROV 550, cage 520 has been re-lowered to a location proximate the ROV (or a separate location to which the ROV may travel to) with a new set of AUVs, which can be deployed in a similar manner as described above. This process, of lowering and raising cage 520 with a new plurality of AUVs and the AUVs being deployed by ROV 550, can be repeated numerous times until the required amount of AUVs have been positioned and/or the survey has been completed. Because the launching of AUVs is performed while surface vessel 510 is still moving in the general direction of the intended seismic survey pattern, a great number of AUVs can be deployed fast and accurately.

While ROV 550 can be deployed by vessel 510, other vessels (such as shooting vessels or unmanned surface vessels) can also deploy ROV 550 before or near the time that cage 520 is lowered. Thus, a first surface vessel may deploy the ROV and a second surface vessel may deploy the cage and multiple pluralities of AUVs. In other embodiments, multiple cages or ROVs can be used to provide even faster deployment times for the AUVs. In one embodiment, the AUVs may be configured to also communicate with acoustic positioning system 511 on the deployment vessel 510 in addition to ROV 550, which may function as a backup communications system.

Once the survey is complete, or a particular portion of the survey is complete such that a group of AUVs no longer needs to remain on the seabed, a signal is selectively provided to a plurality of AUVs by ROV 550 to initiate recovery. The selected AUVs may be chosen from a given row or column if that type of arrangement is used. In one embodiment, the recovery is performed in a reverse manner as the launch, as described above. For example, each selected AUV communicates with ROV 550 and moves toward ROV 550 using an INS or acoustic communications system on the AUV. In another embodiment, ROV 550, a surface vessel, or a subsea station (such as cage 520) may be configured to send acoustic signals to the returning AUVs to guide them to the desired position. In one embodiment, the AUVs are guided into skid 530 for recovery. In other embodiments, robotic arm 310 is used to grab or secure a particular AUV and insert it into skid 530. In still another embodiment, when selected AUVs are instructed to leave their recording locations, they may be programmed to go to a desired rendezvous point where they will be collected by ROV 550 at a later time. In still other embodiments, ROV 550 is moved towards each AUV (or selected AUVs in which their power has been depleted) to grab the AUV and insert it into skid 530. Once a significant amount of AUVs has been recovered in ROV 550, the ROV 550 can transfer the AUVs individually or in groups (via trays or conveyors) to cage 520. Once full, cage 520 can be raised to a surface vessel (which may or may not be the same deployment vessel) while ROV 550 recovers additional AUVs from the seabed. In still other embodiments, the plurality of AUVs are configured to travel directly to a lowered cage or other subsea station without assistance by the ROV.

In other embodiments, ROV 550 is not configured with a guidance system and/or does not communicate with the AUVs for positioning or guidance. Rather, each AUV communicates with acoustic positioning system 511 on surface vessel 510 or a separate surface vessel (see FIGS. 8-10) or another acoustic positioning system deployed in the ocean (such as an underwater base station, cage 520, or another AUV, which may be connected to a surface vessel via a wire). In this embodiment, ROV 550 is still configured to hold a plurality of AUVs and transfer AUVs from cage 520 to skid 530, but all communications between and directions to the AUVs are performed through a separate communications system. Likewise, for recovery of the AUVs, ROV 550 can grab the AUVs and place them in skid 530 and/or cage 520 for ultimate recovery to the surface vessel. While in this embodiment the ROV does not directly provide guidance to the positioning of the AUVs, the use of an ROV for deployment and/or recovery with a separate cage 520 provides a significant increase in deployment and recovery speeds as opposed to current techniques. Further, this eliminates the need for powerful batteries in the AUVs that are able to be deployed to or near the seabed from a surface vessel and travel back to the surface vessel from the seabed. Still further, this eliminates the need for a complicated retrieval system on the surface vessel to retrieve the AUVs from the ocean after the seismic survey has bee completed. Still further, this eliminates the need for the AUVs to directly communicate with a surface vessel, which takes more time, power, and is not as accurate as communicating with a local ROV or other underwater vehicle or station that is more proximate to the AUVs.

Figure 7:
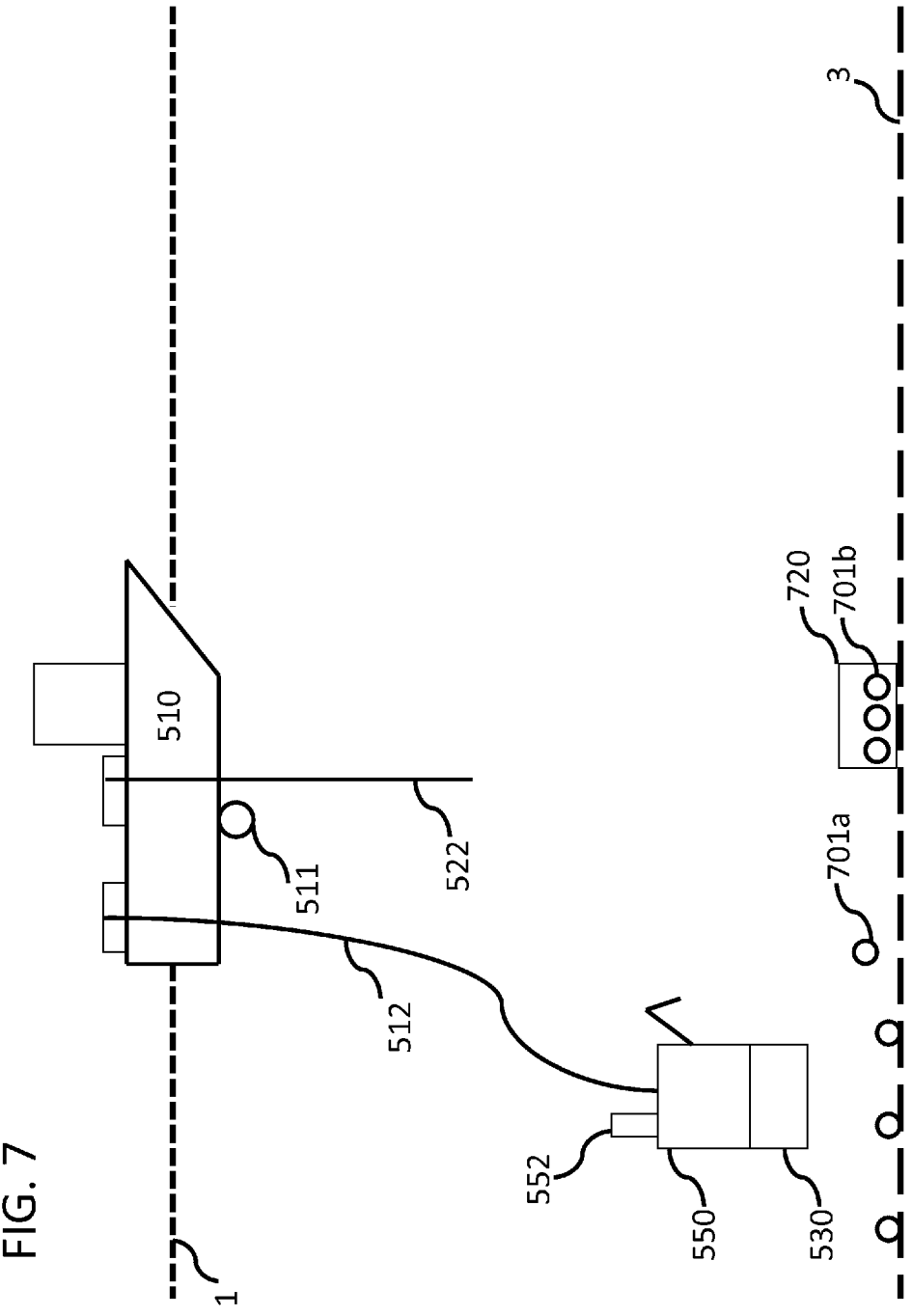
FIG. 7 illustrates one embodiment of a ROV assisted retrieval system for AUVs.

FIG. 7 illustrates another embodiment for the recovery of AUVs using an ROV. This system is similar to the system described in FIG. 5, but utilizes a station or cage 720 that is used in addition to or as replacement of skid 530 of ROV 550. Cage 720 is configured to sit on seabed 3 and store a plurality of AUVs 701b. In this embodiment, guidance of AUVs 701a is still performed through guidance system 552 of ROV 550, as described above in relation to FIGS. 5 and 6. In this embodiment, one or more cages 720 can be deposited on the seabed before or after the deployment of AUVs 701a on or near the seabed (such as described in FIGS. 5 and 6). Once the survey is complete, or a particular portion of the survey is complete such that a group of AUVs 701a no longer needs to remain on the seabed, a signal is provided to a plurality of AUVs 701a to initiate recovery. The AUVs 701a are then guided to cage 720 for temporary storage as stored AUVs 701b within cage 720. The AUVs can be guided via acoustic positioning system 511, guidance system 552, or even a beacon or array of transmitters (not shown) on cage 720, which may be similar to acoustic system 315 and/or 470 of ROV (see FIGS. 3 and 4). In other embodiments, the ROV may also place the AUVs into cage 720, which may be useful if any of the AUVs do not have enough power to return to the cage. When desired, one or more ROVs can retrieve cages 720 and attach them to line 522 for recovery to a surface vessel.

Figure 8:
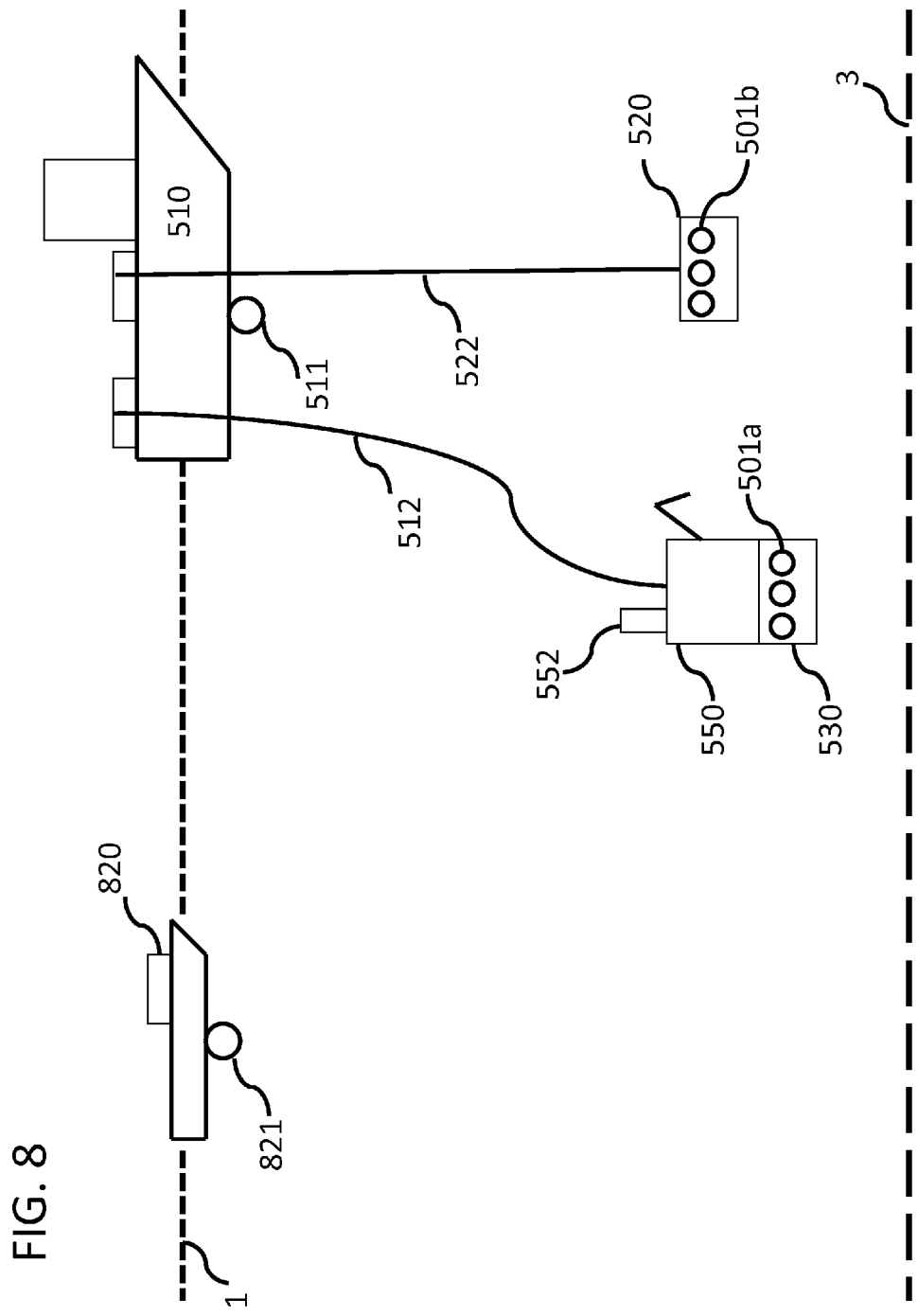
FIG. 8 illustrates one embodiment of a ROV assisted deployment system for AUVs.

FIG. 8 illustrates another system for using an ROV to assist in the guidance of AUVs on or near the seabed. This system is similar to the system described in FIG. 5, but utilizes a second vessel 820 for communications with ROV 550. In one embodiment, vessel 820 is an unmanned surface vessel ("USV"), and in some embodiments it may be a floating buoy with a communications system. In one embodiment, ROV 550 is connected to surface vessel 510 via umbilical system 512. In other embodiments, ROV 550 may be connected to USV 820 by umbilical system 512. USV 820 may be utilized in addition to or as a replacement of surface vessel 510 for communications with ROV 550 and/or the plurality of AUVs. In one embodiment, USV 820 is equipped with acoustic positioning system 821, which may be similar to the acoustic positioning system 511 located on deployment vessel 510. USV 820 is configured to communicate with deployment vessel 510 with a variety of communications, preferably wirelessly. Because USV 820 may be positioned closer to ROV 550 than the deployment vessel 510, USV 820 may provide faster and better communications with ROV 550. Another embodiment uses both deployment vessel 510 and USV 820 to communicate with ROV 550 and/or the plurality of AUVs. The use of two transducers or acoustic positioning systems that communicate with ROV 550 from the different vessels (as opposed to one) increases the electrical and acoustic redundancy of the communications based on two independent measurements. The dual system uses both transducers from the vessels to measure the position of one single target transponder (located on the ROV) by separately controlling the beam forming and phase measurement for each system in parallel. This provides greater accuracy of the AUV positioning and quality control. A more accurate position of ROV 550 provides better data and accuracy to position the AUVs at the desired locations. In another embodiment, a plurality of USVs may be used to communicate with ROV 550 to provide still better accuracy regarding the location of ROV 550. In other embodiments, one or more surface buoys (not shown) may be used in addition to or as a replacement of USV 820 for communication with ROV 550. In still other embodiments, one or more underwater stations or AUVs (not shown) may be used in addition to or as a replacement of USV 820 for communication with ROV 550. In one embodiment, ROV 550 may be deployed or launched by USV 820 instead of deployment vessel 510. In still another embodiment, AUVs may be configured to communicate with both USV 820 (or another surface vessel or device) and vessel 510. In still other embodiments, the AUVs may be configured to communicate with (and be guided and/or instructed by) cage 520 if the cage is equipped with the necessary communications equipment.

In another embodiment, an AUV is dropped from an ROV (such as from the bottom of the ROV or a skid of the ROV) while the ROV is moving. Thus, the ROV need not actually touch the bottom of the seabed during deployment of the AUVs Likewise, the AUVs can be recovered to the moving ROV while the ROV is in motion above the seabed. In other embodiments, the AUVs can be recovered to a skid or cage that is located above the seabed and as it is moved laterally along with a surface vessel. In still other embodiments, a plurality of ROVs and/or a plurality of skids or cages can be towed by one or more surface vessels to deploy and/or recover a plurality of AUVs.

Figure 9:
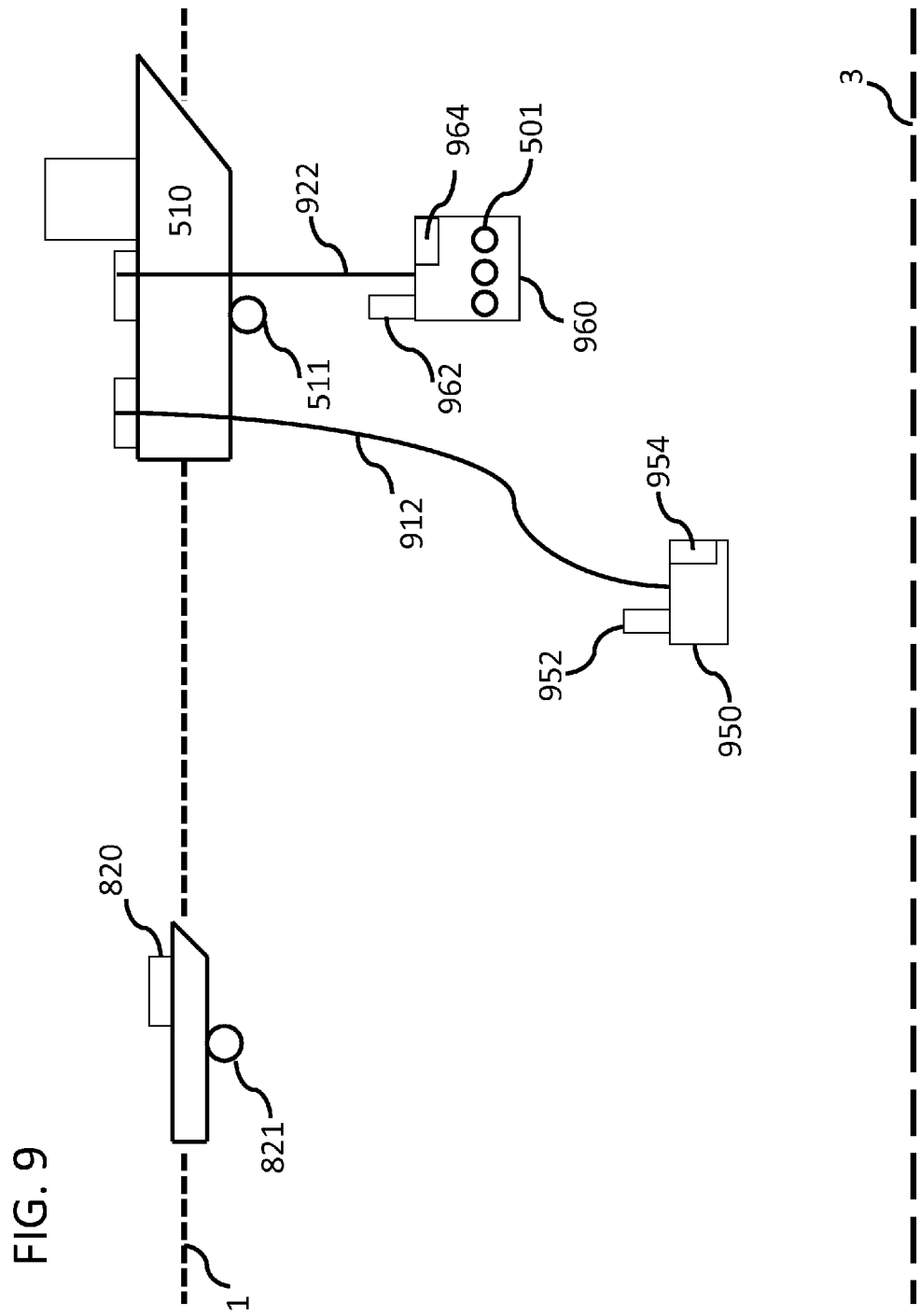
FIG. 9 illustrates one embodiment of an underwater vehicle assisted deployment system for AUVs.

FIG. 9 illustrates another embodiment for the recovery of AUVs using an underwater vehicle, which may or may not be an ROV. Similar to the system described in FIG. 8, this system uses second surface vehicle 820 to help guide the AUVs during subsea operations. Basket or cage 960 is configured to be lowered (and raised) by surface vessel 510 to a subsea position, which may be on or near seabed 3, in the middle of the ocean, or near the surface of the ocean a relatively short distance from surface 1. Cage 960 may be configured with communications system 962 and propulsion system 964, while in some embodiments cage 960 may not have any communications system or propulsion system. Cage 960 is configured to hold a plurality of AUVs 501 in the cage, which may be held in the cage by any number of arrangements, whether by conveyor, conveyor belt, chain, carousel, skid, basket, etc. As in earlier embodiments, any AUVs may be positioned in the cage while on the back deck of surface vessel 510. Communications system 962 may be configured to communicate with other communications systems 511, 821, and 952, as well as the communications systems on each of the plurality of AUVs 501. In some embodiments, cage 960 may have one or more transmitters or pingers configured to transmit acoustic signals (or pings) that may be detected by the AUVs for deployment or retrieval operations. Propulsion system 964 may include any number of thrusters, propellers, nozzles or similar devices known to those of skill in the art to move a subsea basket or station from a first subsea position to a second subsea position, including any such propulsion system that may be used on an ROV as is known in the art.

Underwater vehicle 950 is configured to be lowered by vessel 510 to a subsea position, which may be on or near seabed 3, in the middle of the ocean, or near the surface of the ocean a relatively short distance from surface 1. While in one embodiment underwater vehicle 950 is an ROV, it need not be an ROV. For example, underwater vehicle 950 need not have an arm and it may be a cage or AUV configured with communications system 952 and propulsion system 954. Underwater vehicle 950 may be coupled to surface vessel 510 via wire or umbilical cable 912, which in some embodiments may allow data and power to be communicated to underwater vehicle 950 so that it can stay subsea during longer periods of time and have faster data rates. In some embodiments, communications systems 952 is an acoustic guidance system that may be configured to interact with acoustic system 511 of first vessel 510, acoustic system 821 of second vessel 820, acoustic system 962 of cage 960, and/or the plurality of AUVs 501. While the underwater vehicle may have or be coupled to a skid or cage to hold a plurality of AUVs, such a holding assembly is not necessary in this embodiment. The system described in FIG. 9 operates substantially similar to the prior embodiments with underwater vehicle 950 providing some guidance to the deployment of AUVs 501 from cage 960 and/or to the seabed. In the embodiment shown in FIG. 9, however, underwater vehicle 950 does not physically retrieve, grab, or move any AUVs. Instead, underwater vehicle 950 is used solely as a positioning and/or guidance system for the deployment and/or retrieval of the plurality of AUVs. In some embodiments, underwater vehicle 950 and/or second vessel 820 may actively travel closer to one or more deployment locations for increased communications accuracy and/or speed to the plurality of AUVs in that general deployment location. This allows the AUVs to be positioned on the seabed with enhanced accuracy. The configuration described in relation to FIG. 9 allows cage 960 to be raised back to surface vessel to obtain a second plurality of AUVs while the first plurality of AUVs are being deployed by another vehicle, such as by second vessel 820 or underwater vehicle 950, and allows increased communications efficiency and accuracy with the AUVs during deployment to the seabed. In other words, a separate vehicle may be positioned more proximate to the intended deployment position on the seabed or near the AUVs as they are deploying to the seabed, whether the second vehicle is second vessel 820 or underwater vehicle 950. Thus, a communications system on each AUV must be configured to interface with a communications system on each or both of surface vessel 820 and/or underwater vehicle 950, and in one embodiment such a communications may be one of USBL, iSBL, iUSBL, or any combination thereof. In one embodiment, the plurality of AUVs may be launched from cage 960 based upon communications provided to the plurality of AUVs from one of many potential locations, including first surface vessel 510, second surface vessel 820, underwater vehicle 950, or cage 960. The plurality of AUVs may be launched individually, sequentially, or near simultaneously. In one embodiment, once one or more of the plurality of AUVs leaves cage 950 and arrives at a second subsea position, a second station or vessel may take over the guidance and/or positioning of the AUVs to land at the intended seabed location. In other words, while a first vehicle or device (such as cage 960 and/or first vessel 510) may instruct the AUVs to leave the cage, a second vehicle (such as underwater vehicle 950 or second vessel 820) may instruct, guide, and/or position the AUVs to their final seabed destination. In some embodiments, for increased positioning accuracy and faster communications, second vessel 820 may be positioned proximate to a subsea position substantially where the AUVs are to be deployed (such as being located on the water surface at a point substantially over one or more of the intended deployment locations of the AUVs) and/or underwater vehicle 950 may be positioned proximate to the position of the deployed AUVs (which may be near the seabed).

Each of the plurality of AUVs may have a predetermined location on seabed 3 as to which it will land, couple with the seabed, and record seismic signals during any seismic survey. During any retrieval operations, a recovery station may be utilized, which is in one embodiment the same as or substantially similar to cage 960. In one embodiment, one of the surface vessels or underwater vehicle 950 provides a communication to each of the selected AUVs to wake up and return to a recovery station and/or cage after the seismic survey has been completed. Such communications may include the subsea location of the recovery position and/or cage. In some embodiments, recovery station and/or cage 960 may include a homing array and/or a plurality of transmitters or pingers that is configured to emit a plurality of acoustic signals or pings to which the plurality of AUVs may be guided to during retrieval operations, which allows for increased accuracy and/or positioning of the AUVs to the cage when in a close proximity to the cage. Such a system may be similar to the acoustic guidance system and/or communications system described in relation to FIG. 4 or the systems disclosed in Publication No. WO 2014/147165 and US Publication No. 2014/0301161, each incorporated herein by reference. In some embodiments, multiple cages may be used at the same time, such that a greater number of AUVs may be deployed and/or retrieved at a given time.

Figure 10:
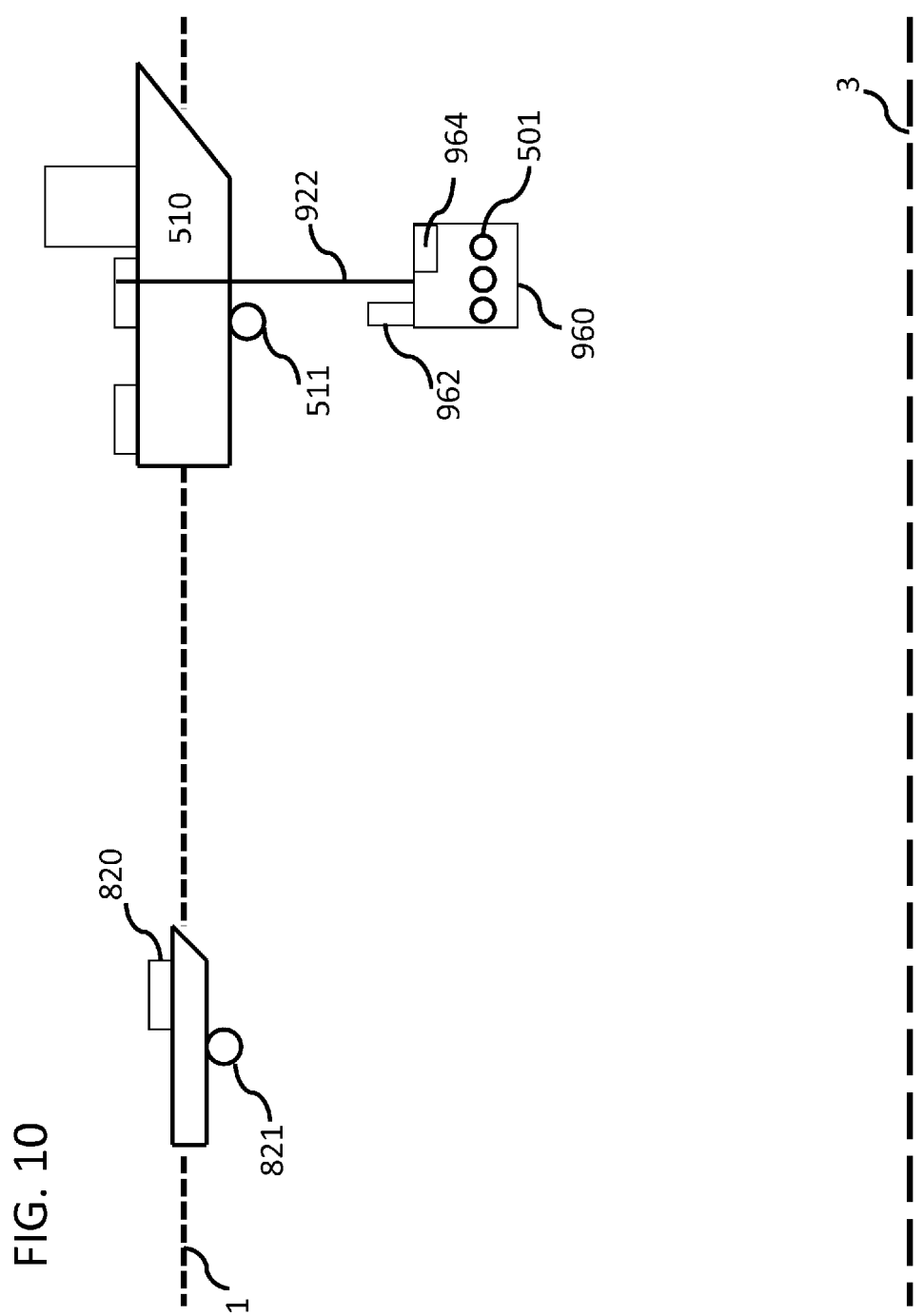
FIG. 10 illustrates one embodiment of a subsea station assisted deployment system for AUVs.

FIG. 10 illustrates another embodiment for the recovery of AUVs using an underwater vehicle. This system is similar to the system described in FIG. 9, but does not use a second subsea vehicle besides cage 960. Similar to the systems described in FIGS. 8 and 9, this system uses second surface vehicle 820 to help guide the AUVs during one or more subsea operations. Basket or cage 960 is configured to be lowered (and raised) by surface vessel 510 to a subsea position, which may be on or near seabed 3, in the middle of the ocean, or near the surface of the ocean a relatively short distance from surface 1. In one embodiment, cage 960 is substantially similar to the cage described in relation to FIG. 9, and thus may or may not have communications system 962 and propulsion system 964. Like the system described in relation to FIG. 9, it may be configured with a homing system or set of transmitters or pingers. In one embodiment, cage 960 is lowered to a first subsea position with a plurality of AUVs. One or more of the plurality of AUVs may be launched from cage 960 based on communications from cage 960, first vessel 510, or second vessel 820. In one embodiment, second vessel 820 travels to a surface position proximate to the intended deployment position of the AUVs. Once the AUVs have left the cage and have travelled to a first subsea position and/or are in route to a subsea position, first vessel 510 and/or second vessel 820 may provide communications to the AUVs to actively guide and/or position them to a predetermined destination on the seabed. The cage may raised and filled with a new set of AUVs, which may be deployed again in a similar manner. During retrieval operations, the AUVs may be sent a signal to wake-up and/or move to a subsea recovery position, which may be on or near the seabed or proximate to cage 960. Such communications may be provided to the AUVs by cage 960, first vessel 510, or second vessel 820. In one embodiment, each AUV has a homing array that guides the AUV towards one or more pings or signals emitting from cage 960. In some embodiments, multiple cages may be used for faster deployment and/or recovery of the AUVs.

Figure 11:
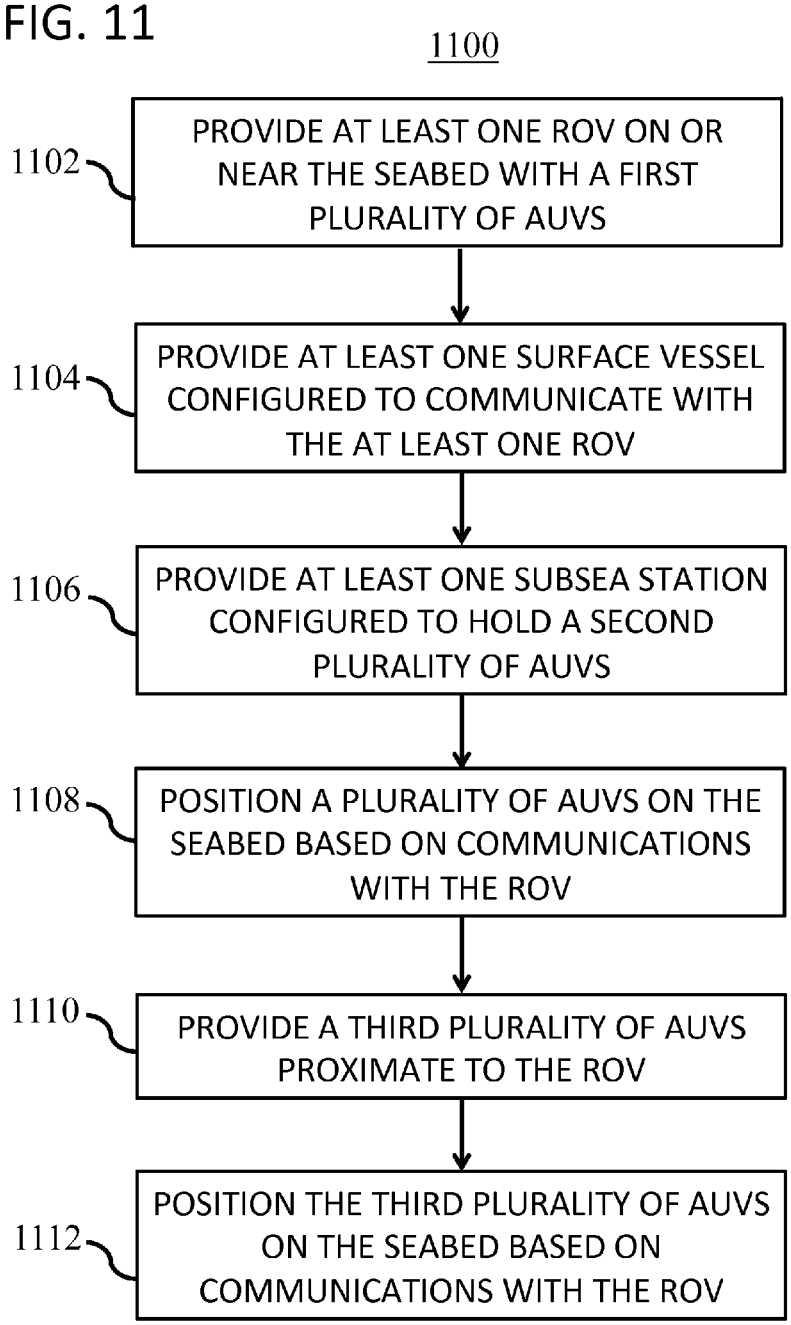
FIG. 11 illustrates one embodiment of a method to deploy AUVs using a ROV.

FIG. 11 illustrates one embodiment of a method 1100 for assisting with the deployment of a plurality of seismic AUVs with an ROV or other underwater vehicle. In an embodiment, the method includes providing at least one ROV on or near the seabed, as shown in block 1102. In one embodiment, the ROV may be lowered by a first surface vessel and may or may not comprise a first plurality of AUVs (such as being located within a skid of the ROV). The ROV has a guidance system for communicating with a plurality of AUVs. The method further includes providing at least one surface vessel to communicate with the at least one ROV, as shown in block 1104. The surface vessel can be a deployment vessel, a shooting vessel, an unmanned surface vessel (USV), or other surface vessels or stations. The vessel may have an acoustic positioning system that is configured to communicate with the ROV, but in some embodiments may only be connected to the ROV via a wire and/or umbilical system. In one embodiment, the ROV is configured to determine its subsea position based upon acoustic communications with the surface vessel. In some embodiments, the acoustic positioning system of the surface vessel can also communicate with a plurality of AUVs. The method further includes providing at least one subsea station configured to hold a plurality of AUVs, as shown in block 1106. In one embodiment, the subsea station is a basket or cage filled with a second plurality of AUVs that is deployed from the same vessel that provides or deploys the ROV. In other embodiments, a separate vessel deploys the subsea station. The subsea station may be deployed on the seabed (which may be preferred for stability reasons) or merely hang on a connecting wire from the surface vessel a certain distance above the seabed or beneath the surface. In still other embodiments, the subsea station may be connected to an underwater vehicle, such as a skid. In one embodiment, the ROV is deployed first on or near the seabed, while in another embodiment the subsea station is deployed first on or near the seabed. The method further includes positioning a plurality of AUVs on the seabed based on communications with the ROV, as shown in block 1108. The plurality of AUVs may be those located on the subsea station and/or those located on the ROV itself. The first plurality of AUVs may be deployed first or the second plurality of AUVs may be deployed first. In some embodiments, the first plurality of AUVs (within the skid) are deployed first and then a portion of the second plurality of AUVs are transferred to the ROV and then subsequently deployed when the ROV is in a position proximate to the intended destination location. In other embodiments, the AUVs are launched directly from the subsea station based on communications provided by the ROV. In one embodiment, a guidance system on the ROV interacts with an acoustic communications system or INS on each AUV to provide the AUV directions and coordinates as to the intended deployment location. The AUVs may be deployed along a predetermined pattern, e.g., a regular grid based on predetermined coordinates. In one embodiment, a particular AUV is selectively instructed to wake up and travel to a seabed destination based on the AUV's propulsion system and guidance system receiving commands from the ROV's guidance system. An AUV may be deployed one at a time until it arrives at its seabed location, or a plurality of AUVs may be deployed simultaneously or near the same time. In some situations, the ROV may travel to the general area proximate to the seabed destination with a group of AUVs and then deploy the relevant AUVs. The ROV may verify the positions of the AUVs and confirm that they are located at the correct locations in the predetermined grid. In one embodiment, the method further comprises providing a third plurality of AUVs proximate to the ROV, as shown in block 1110. The third plurality of AUVs may be lowered by the same subsea station (such as the same basket or cage) that delivered the second plurality of AUVs. In other embodiments, a separate vessel or station may deliver the third plurality of AUVs proximate to a location proximate to the ROV or to the intended AUV seabed destination. The method further comprises positioning the third plurality of AUVs on or near the seabed based on communications with the ROV, as shown in block 1112. This positioning step may, but not necessarily, be performed in the same way as described in step 1108. Once the AUVs are in place and operational, the AUVs are ready to acquire and record seismic data. During the recordal of seismic data, the ROV may confirm that the AUVs are active and recording data, along with the status of other components (e.g., power unit capacity, data storage capacity, etc.). If a particular AUV needs to be replaced and/or is no longer working, the ROV may retrieve the problematic AUV and replace it with another AUV that is located in the ROV skid.

Figure 12:
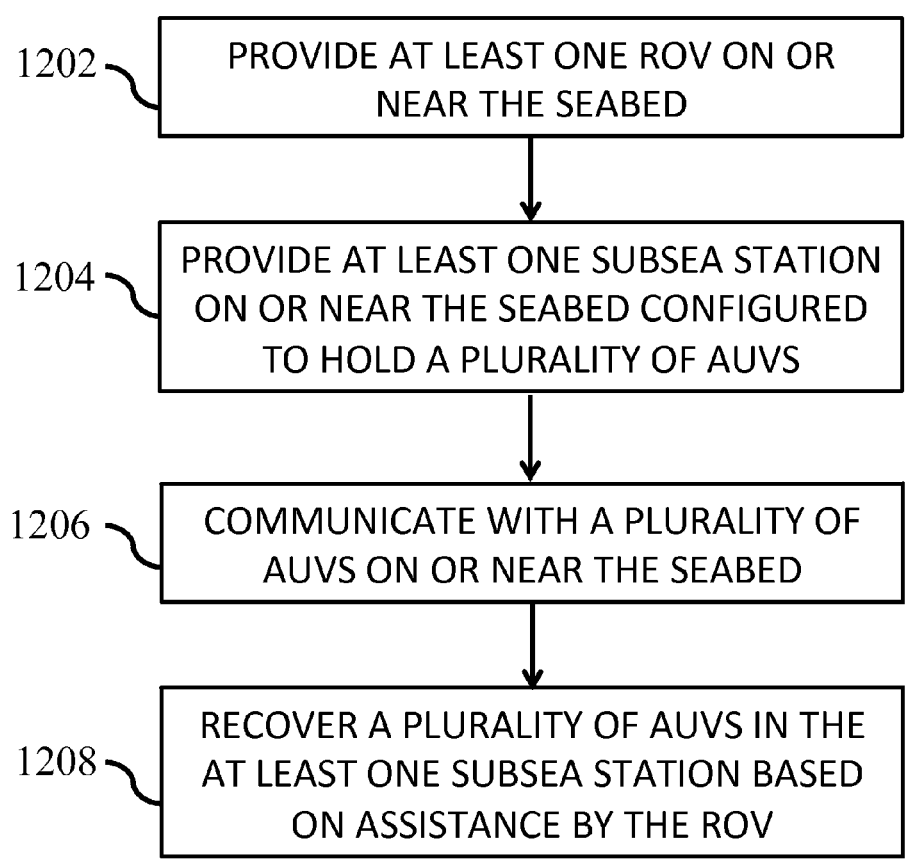
FIG. 12 illustrates one embodiment of a method to recover AUVs using a ROV.

FIG. 12 illustrates one embodiment of a method 1200 for assisting with the recovery of a plurality of seismic AUVs with an ROV or other underwater vehicle. In an embodiment, the method includes providing at least one ROV on or near the seabed, as shown in block 1202. The ROV may or may not comprise a skid that is configured to hold a plurality of AUVs. The ROV has a guidance system for guiding and/or communicating with a plurality of AUVs. The method further includes providing at least one subsea recovery station configured to hold a plurality of AUVs, as shown in block 1204. In one embodiment, the subsea station is a cage or basket that is deployed from a surface vessel, and may or may not be the same station used to deploy the AUVs to the seabed. In other embodiments, a separate vessel provides the subsea recovery station. In other embodiments, a plurality of subsea stations has been positioned on the seabed in proximity to one or more groups of AUVs. In still another embodiment, the subsea station is a skid or other holding device that is part of or coupled to an underwater vehicle, such as the ROV. In some embodiments, the subsea station is not positioned near the seabed but is merely positioned in the body of water at some distance beneath the vessel and/or water surface. The method further includes communicating with a plurality of AUVs on or near the seabed, as shown in block 1206. These AUVs may or may not have been previously positioned by an ROV. In one embodiment, the AUVs are located on the seabed and need to be recovered to the surface for data recovery after their recording of seismic waves. In one embodiment, the ROV communicates with each of (or a portion of) the plurality of AUVs, in which a particular AUV is selectively instructed to wake up and travel to a subsea recovery destination based on the AUV's propulsion system and guidance system receiving commands from the ROV's guidance system. The method further includes recovering and/or positioning a plurality of AUVs into at least one subsea recovery station based on assistance by the ROV, as shown in block 1208. In one embodiment, the assistance is based on acoustic communications between the ROV and the plurality of AUVs. In this embodiment, a guidance system on the ROV interacts with an acoustic communications system or INS on each AUV to provide the AUV directions and coordinates as to the intended subsea recovery location, which may be a single spot on the seabed, within the ROV, or in the subsea station. In other instances, the ROV assistance is the grabbing or securing of the plurality of AUVs by the ROV, such as by a robotic arm, and the placement of the AUVs in the intended subsea station. These communicating and positioning steps can be repeated multiple times until all of the AUVs are recovered in one or more subsea stations. In one embodiment, the plurality of AUVs and/or the plurality of subsea stations are recovered to a surface vessel.

FIG. 13 illustrates another embodiment of a method 1300 for assisting with the deployment of a plurality of seismic AUVs. In one embodiment, a subsea station with a plurality of AUVs is launched from a first surface vessel to a subsea position, as shown in block 1302. The subsea station may be a cage or basket or other similar structure configured to hold and deploy a plurality of AUVs subsea, while in other embodiments it may be coupled to an underwater vehicle. The subsea position may be on or near the bottom of the ocean, in the middle of the ocean, or near the surface of the ocean. The subsea station may or may not have an acoustic guidance system and/or a propulsion system. One or more of the plurality of AUVs are then launched from the subsea station based upon communications provided to the one or more plurality of AUVs from one of various locations or devices, including a first surface vessel, a second surface vessel, an underwater vehicle (such as an ROV), or the subsea station itself, as shown in block 1304. The plurality of AUVs may be launched individually, sequentially, or near simultaneously. In one embodiment, the AUVs leave the subsea station and travel to a second subsea position to await further commands. The second subsea location may be a subsea position near the station, near a separate vessel or vehicle, or on or near a seabed position. A separate vehicle may be positioned to a position proximate to the one or more launched AUVs and/or to a position where the AUVs are to be deployed on the seabed, as shown in block 1306. In some embodiments, a second surface vehicle or vessel (such as vessel 820) may be positioned proximate to a subsea position where the AUVs are to be deployed. Likewise, an underwater vehicle (such as a ROV) may be positioned proximate to the position of the deployed AUVs. Once the AUVs have been launched from the subsea station, the one or more AUVs are guided to a predetermined seabed location for the recording of seismic data, as shown in block 1308. The trajectory of the AUV may be adjusted in real time based on received communications. In one embodiment, once one or more of the plurality of AUVs leaves the subsea station and arrives at a second subsea position, a second vehicle, station, or vessel may take over and/or assist with the guidance and/or positioning of the AUVs to land at a seabed location. In other words, while a first vehicle or device (such as the basket or first surface vessel) may instruct the AUVs to leave the subsea station, a second vehicle or device (such as an underwater vehicle or second vessel) may instruct, guide, and/or position the AUVs to their final seabed destination. In some embodiments, the position of the AUV may be determined based upon communications with multiple systems, such as by one or more surface vehicles, an underwater vehicle, and/or the subsea station. In some embodiments a single AUV is launched from the subsea station and deployed to a seabed location, while in other embodiments a plurality of AUVs are launched from the subsea station and deployed to a plurality of seabed locations. While the first plurality of AUVs is being deployed to the seabed (and after the AUVs have left the subsea station), the subsea station is raised back to the first surface vessel for transferring a second plurality of AUVs to the subsea station. Similar to the prior steps, the second plurality of AUVs may be launched from the subsea station (based on instructions by a first communications system) and once freely travelling in water may be guided and/or positioned to another subsea position (such as a predetermined location on the seabed) by a second communications system.

After the seismic survey is completed, which may be days or months after being positioned on the seabed, the plurality of AUVs must be retrieved to a surface vessel. In some embodiments, the method 1300 includes various retrieval operations for the plurality of deployed AUVs. For example, method 1300 may include recovering one or more of the deployed AUVs at a subsea position, as shown in block 1310. In one embodiment, the plurality of AUVs are instructed to travel to a first subsea position from each of their deployed seabed locations, which may be on or near the seabed or proximate to a subsea recovery station. Such a position may be near the seabed or near the surface of the body of water. In one embodiment, a separate vehicle or station (such as first or second surface vessel, underwater vehicle, or the recovery basket or station) communicates the coordinates of the subsea position to the plurality of AUVs, along with any necessary wake up commands and other instructions. In some embodiments, the AUVs may travel to a position near the intended recovery position (or underwater vehicle, cage, or basket) or the recovery station may travel to a position proximate to the plurality of AUVs. Method 1300 may further include retrieving the one or more AUVs into a subsea recovery station, as shown in block 1312. The subsea recovery station may or may not be the same subsea station used to deploy the AUVs, and it may include a cage, basket, or similar holding structure, and may or may not be coupled to an underwater vehicle. For example, once the AUVs are in a position proximate to the recovery station, the AUVs are instructed to return to the recovery station. In one embodiment, one of the surface vehicles, an underwater vehicle, and/or recovery station itself (such as a basket) communicates the coordinates of the recovery position and/or recovery station to the plurality of AUVs. In some embodiments, the AUVs are guided to the recovery station by a homing array that detects one or more pings or acoustic signals emitting from the recovery station. Once the AUVs are loaded onto the subsea recovery station, it may be raised back to a recovery vessel (which may or may not be the same vessel as the deployment vessel), the AUVs transferred from the recovery station to the vessel, and an empty recovery station returned to a subsea position for loading of additional AUVs. Steps 1310 and 1312 may be repeated until the necessary amount of AUVs has been retrieved from the seabed. In some embodiments, multiple recovery stations, such as multiple baskets, may be used simultaneously. In one embodiment, the AUVs are deployed from a subsea station from a position substantially near the ocean surface while the AUVs are retrieved into a subsea station on or substantially near the seabed.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of a node and the wireless systems on the node and/or vessel are within the scope of the invention. For example, the AUV may be of any configuration, and may be designed to couple to the seabed or merely near the seabed. In one embodiment, a first vessel may act as a deployment vessel, a second vessel may act as a retrieval vessel, and a third vessel may act as the seismic source/shooting vessel. As another example, the ROV may not comprise a robotic arm and may simply act as a deployment and/or retrieval guide by the use of its communications system and/or acoustic guidance system. In other embodiments, a subsea station, cage, or other underwater vehicle may be used to provide commands and/or acoustic communications with the plurality of AUVs. In still other embodiments, the AUVs may be deployed from a cage and retrieved to that cage without the use of a ROV. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system for the deployment of seismic nodes on or near the seabed, comprising
   a plurality of autonomous underwater vehicles (AUVs), wherein each AUV comprises one or more seismic sensors, a propulsion system, and a guidance system;
   a remotely operated vehicle (ROV) coupled to a surface vessel, wherein the ROV comprises a guidance system configured to communicate with each of the plurality of AUVs and to guide each of the plurality of AUVs from a first subsea position to a second subsea position, wherein the ROV comprises a propulsion system; and
   a subsea station coupled to the surface vessel and configured to carry the plurality of AUVs, wherein the subsea station is configured to be lowered and raised between the surface vessel and a subsea position.

2. The system of claim 1, further comprising a skid coupled to the ROV, wherein the skid is configured to carry a second plurality of the AUVs.

3. The system of claim 1, wherein the subsea station is configured to carry a second plurality of the AUVs from the surface vessel.

4. The system of claim 1, wherein the ROV is configured to couple with the subsea station to transfer a plurality of AUVs between the subsea station and the ROV.

5. The system of claim 1, wherein the ROV is configured to instruct each of the plurality of AUVs to launch from the subsea station and travel to a seabed location.

6. The system of claim 1, wherein each of the plurality of AUVs is configured to determine its subsea position based on acoustic communications with the ROV.

7. The system of claim 1, wherein the plurality of AUVs may be deployed from a first surface vessel while the ROV is coupled to a second surface vessel.

8. The system of claim 1, wherein each of the plurality of AUVs has a different channel or code based on spread spectrum domain as to which it receives and sends communications.

9. A method for the deployment of a plurality of seismic nodes on or near the seabed, comprising
   positioning an underwater vehicle at a location proximate to the seabed, wherein the underwater vehicle comprises an acoustic guidance system and a propulsion system,
   positioning a first plurality of autonomous underwater vehicles (AUVs) in a subsea station while on a surface vessel, wherein each AUV comprises one or more seismic sensors, a propulsion system, and a guidance system;
   positioning the subsea station from the surface vessel to a subsea position; and
   deploying the first plurality of AUVs at predetermined positions on the seabed based on communications provided by the underwater vehicle.

10. The method of claim 9, wherein the underwater vehicle is a remotely operated vehicle (ROV).

11. The method of claim 9, further comprising transferring the first plurality of AUVs from the subsea station to the underwater vehicle.

12. The method of claim 9, further comprising launching the first plurality of AUVs from the subsea station based on communications provided by the underwater vehicle.

13. The method of claim 9, further comprising recovering one or more of the first plurality of AUVs from the seabed to a subsea position based on communications with the underwater vehicle.

14. The method of claim 9, further comprising recovering one or more of the first plurality of AUVs from the seabed into a subsea station by a robotic arm on the underwater vehicle.

15. The method of claim 9, further comprising
   positioning a second plurality of autonomous underwater vehicles (AUVs) near the seabed; and
   deploying the second plurality of AUVs at predetermined positions on the seabed based on communications with the underwater vehicle.

16. The method of claim 15, wherein the positioning of the second plurality of AUVs comprises lowering a skid from a surface vessel, wherein the skid is coupled to the underwater vehicle, wherein the skid is configured to hold the second plurality of AUVs.

17. A system for the deployment of seismic nodes on or near the seabed, comprising
a plurality of autonomous underwater vehicles (AUVs), wherein each AUV comprises one or more seismic sensors, a propulsion system, and a guidance system; and
a subsea station coupled to a first surface vessel, wherein the subsea station is configured to carry a first plurality of the AUVs and be lowered from the first surface vessel to a subsea position, wherein the subsea station comprises a communications system configured to communicate with each of the plurality of AUVs, wherein the subsea station comprises a guidance system configured to launch one or more of the plurality of AUVs from the subsea station.

18. The system of claim 17, wherein the subsea station is configured to position the plurality of AUVs from a first subsea position to a second subsea position.

19. The system of claim 17, wherein the second surface vessel is configured to position the plurality of AUVs from a first subsea position to a second subsea position.

20. The system of claim 17, wherein the second surface vessel is configured to position each of the plurality of AUVs from a position proximate to the subsea station to a predetermined position on the seabed.

21. The system of claim 17, further comprising a second guidance system configured to communicate with the guidance system on each of the plurality of AUVs, wherein the second guidance system is configured to guide one or more of the plurality of AUVs to one or more seabed locations.

22. The system of claim 17, wherein the second surface vessel is configured to instruct the plurality of AUVs to return to a subsea position for recovery.

23. The system of claim 17, wherein the subsea station comprises a plurality of pingers that is configured to emit signals to the plurality of AUVs, wherein each of the AUVs comprises a homing array that is configured to detect the transmitted signals during recovery to the subsea station.

24. A method for the deployment of a plurality of seismic nodes on or near the seabed, comprising
positioning a first plurality of autonomous underwater vehicles (AUVs) in a subsea station on a first surface vessel, wherein each AUV comprises one or more seismic sensors, a propulsion system, and a guidance system;
lowering the subsea station from the first surface vessel to a first subsea location;
launching the first plurality of AUVs from the subsea station based on communications from the subsea station; and
deploying each of the first plurality of AUVs at a predetermined position on the seabed.

25. The method of claim 24, further comprising guiding the first plurality of AUVs to one or more seabed locations based on communications provided by a second surface vessel.

26. The method of claim 24, further comprising guiding the first plurality of AUVs to one or more seabed locations based on communications provided by the subsea station.

27. The method of claim 24, further comprising launching the first plurality of AUVs from the subsea station based on communications provided by a second surface vessel.

28. The method of claim 24, further comprising launching the first plurality of AUVs from the subsea station based on communications provided by a first communications system and guiding the first plurality of AUVs to one or more seabed locations based on communications provided by a second communications system.

29. The method of claim 24, further comprising raising the subsea station to the first surface vessel;
positioning a second plurality of AUVs in the subsea station;
lowering the subsea station to a subsea position;
launching the second plurality of AUVs from the subsea station; and
deploying each of the second plurality of AUVs at a predetermined position on the seabed.

30. The method of claim 24, further comprising recovering the first plurality of AUVs to a subsea recovery station based on signals provided by the recovery station.

* * * * *